(12) United States Patent
Tsuchiya et al.

(10) Patent No.: US 10,691,564 B2
(45) Date of Patent: Jun. 23, 2020

(54) STORAGE SYSTEM AND STORAGE CONTROL METHOD

(71) Applicant: HITACHI, LTD., Tokyo (JP)

(72) Inventors: Akiyoshi Tsuchiya, Tokyo (JP); Tomohiro Kawaguchi, Tokyo (JP); Tsukasa Shibayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 19 days.

(21) Appl. No.: 16/117,719

(22) Filed: Aug. 30, 2018

(65) Prior Publication Data

US 2019/0294516 A1 Sep. 26, 2019

(30) Foreign Application Priority Data

Mar. 26, 2018 (JP) ................. 2018-059091

(51) Int. Cl.
*G06F 11/20* (2006.01)
*G06F 11/14* (2006.01)
*G06F 3/06* (2006.01)
*G06F 9/50* (2006.01)
*G06F 9/455* (2018.01)
*G06F 11/07* (2006.01)

(52) U.S. Cl.
CPC .......... *G06F 11/2082* (2013.01); *G06F 3/067* (2013.01); *G06F 3/0607* (2013.01); *G06F 3/0634* (2013.01); *G06F 3/0647* (2013.01); *G06F 3/0689* (2013.01); *G06F 9/45558* (2013.01); *G06F 9/5083* (2013.01); *G06F 11/1464* (2013.01); *G06F 11/0709* (2013.01)

(58) Field of Classification Search
CPC .. G06F 11/2082; G06F 3/067; G06F 9/45558; G06F 9/5083; G06F 3/0607; G06F 3/0689; G06F 3/0634; G06F 3/0647; G06F 11/1464; G06F 11/0709; G06F 2009/45579
See application file for complete search history.

(56) References Cited

U.S. PATENT DOCUMENTS

| 2010/0100679 A1* | 4/2010 | Balasubramanian ........................ G06F 3/0605 711/114 |
| 2017/0270176 A1* | 9/2017 | Horowitz ................. G06F 11/14 |
| 2018/0246751 A1* | 8/2018 | Dong .................... G06F 9/4856 |

FOREIGN PATENT DOCUMENTS

JP 2014-075027 A 4/2014

* cited by examiner

*Primary Examiner* — Charles Rones
*Assistant Examiner* — Tong B Vo
(74) *Attorney, Agent, or Firm* — Baker Botts L.L.P.

(57) ABSTRACT

An active control program and a passive control program included in the same program cluster in a plurality of storage nodes are each arranged in the storage nodes different from each other. Each of the storage nodes is configured to include a plurality of active or passive control programs. When any one of the plurality of the passive control programs is switched to active, a change of an operation status is made for the different passive control program operating in the storage node that includes the passive control program switched to active.

14 Claims, 23 Drawing Sheets

FIG. 8

CONTROL PROGRAM MANAGEMENT TABLE
403

| CONTROL PROGRAM # (801) | STATE (802) | PAIR # (803) | OPERATION NODE # (804) | USE CAPACITY (805) | CPU LOAD (%) (806) | USE MEMORY AMOUNT (807) | USE COMMUNICATION BANDWIDTH (808) |
|---|---|---|---|---|---|---|---|
| 1 | ACTIVE | 1 | 1 | ... | ... | ... | ... |
| 2 | PASSIVE | 1 | 4 | ... | ... | ... | ... |
| 3 | DEAD | 2 | 2 | ... | ... | ... | ... |
| 4 | ACTIVE | 2 | 4 | ... | ... | ... | ... |
| 5 | ACTIVE | 3 | 3 | ... | ... | ... | ... |
| 6 | PASSIVE | 3 | 4 | ... | ... | ... | ... |
| 7 | ACTIVE | 4 | 5 | ... | ... | ... | ... |
| 8 | PASSIVE | 4 | 8 | ... | ... | ... | ... |
| 9 | ACTIVE | 5 | 6 | ... | ... | ... | ... |
| 10 | PASSIVE | 5 | 8 | ... | ... | ... | ... |
| 11 | ACTIVE | 6 | 7 | ... | ... | ... | ... |
| ... | ... | ... | ... | | | | |

FIG. 9

NODE MANAGEMENT TABLE 402

| NODE # 901 | STATE 902 | NUMBER OF ACTIVE CONTROL PROGRAMS 903 | NUMBER OF PASSIVE CONTROL PROGRAMS 904 | MAXIMUM CAPACITY 905 | USE CAPACITY 906 | CPU LOAD (%) 907 | MAXIMUM MEMORY AMOUNT 908 | USE MEMORY AMOUNT 909 | MAXIMUM COMMUNI- CATION BANDWIDTH 910 | USE COMMUNI- CATION BANDWIDTH 911 |
|---|---|---|---|---|---|---|---|---|---|---|
| 1 | NORMAL | 1 | 0 | ... | ... | ... | ... | ... | ... | ... |
| 2 | ABNORMAL | 1 | 0 | ... | ... | ... | ... | ... | ... | ... |
| 3 | NORMAL | 1 | 0 | ... | ... | ... | ... | ... | ... | ... |
| 4 | NORMAL | 0 | 3 | ... | ... | ... | ... | ... | ... | ... |
| 5 | NORMAL | 1 | 0 | ... | ... | ... | ... | ... | ... | ... |
| 6 | NORMAL | 1 | 0 | ... | ... | ... | ... | ... | ... | ... |
| 7 | NORMAL | 1 | 0 | ... | ... | ... | ... | ... | ... | ... |
| ... | ... | ... | ... | ... | ... | ... | ... | ... | ... | ... |

FIG.10

RESOURCE ALLOCATION MANAGEMENT TABLE
404

| CONTROL PROGRAM # | CPU CORE # | MEMORY AREA | ... |
|---|---|---|---|
| 2 | 1 | xxxx-yyyy | ... |
| 4 | 2 | aaaa-bbbb | ... |
| 6 | 3 | ffff-gggg | ... |
| ... | ... | ... | ... |

PHYSICAL CHUNK MANAGEMENT TABLE
1100

| PHYSICAL CHUNK # (1101) | PARENT NODE # (1102) | PDEV# (1103) | IN-PDEV OFFSET (1104) |
|---|---|---|---|
| 0 | 0 | 0 | 0x00000 |
| 1 | 0 | 0 | 0x10000 |
| 2 | 0 | 0 | 0x20000 |
| 3 | 0 | 1 | 0x00000 |
| 4 | 1 | 0 | 0x00000 |
| ... | ... | ... | ... |

FIG.12

LOGICAL CHUNK MANAGEMENT TABLE
1200

| LOGICAL CHUNK # (1201) | CONTROL PROGRAM # (1202) | MASTER PHYSICAL CHUNK # (1203) | MIRROR PHYSICAL CHUNK # (1204) |
|---|---|---|---|
| 0 | 0 | 0 | 4 |
| 1 | 1 | 1 | 5 |
| 2 | 1 | 3 | 6 |
| ... | ... | ... | ... |

FIG. 21

NODE MANAGEMENT TABLE
2100

| 901 | 902 | FAULT SET # (2103) | 903 | 904 | 905 | 906 | 907 | 908 | 909 | 910 | 911 |
|---|---|---|---|---|---|---|---|---|---|---|---|
| 1 | NORMAL | 1 | 1 | 0 | ⋮ | ⋮ | ⋮ | ⋮ | ⋮ | ⋮ | ⋮ |
| 2 | ABNORMAL | 2 | 1 | 0 | ⋮ | ⋮ | ⋮ | ⋮ | ⋮ | ⋮ | ⋮ |
| 3 | NORMAL | 3 | 1 | 0 | ⋮ | ⋮ | ⋮ | ⋮ | ⋮ | ⋮ | ⋮ |
| 4 | NORMAL | 4 | 0 | 3 | ⋮ | ⋮ | ⋮ | ⋮ | ⋮ | ⋮ | ⋮ |
| 5 | NORMAL | 1 | 1 | 0 | ⋮ | ⋮ | ⋮ | ⋮ | ⋮ | ⋮ | ⋮ |
| 6 | NORMAL | 2 | 1 | 0 | ⋮ | ⋮ | ⋮ | ⋮ | ⋮ | ⋮ | ⋮ |
| 7 | NORMAL | 3 | 1 | 0 | ⋮ | ⋮ | ⋮ | ⋮ | ⋮ | ⋮ | ⋮ |
| ⋮ | ⋮ | ⋮ | ⋮ | ⋮ | | | | | | | |

FIG. 23
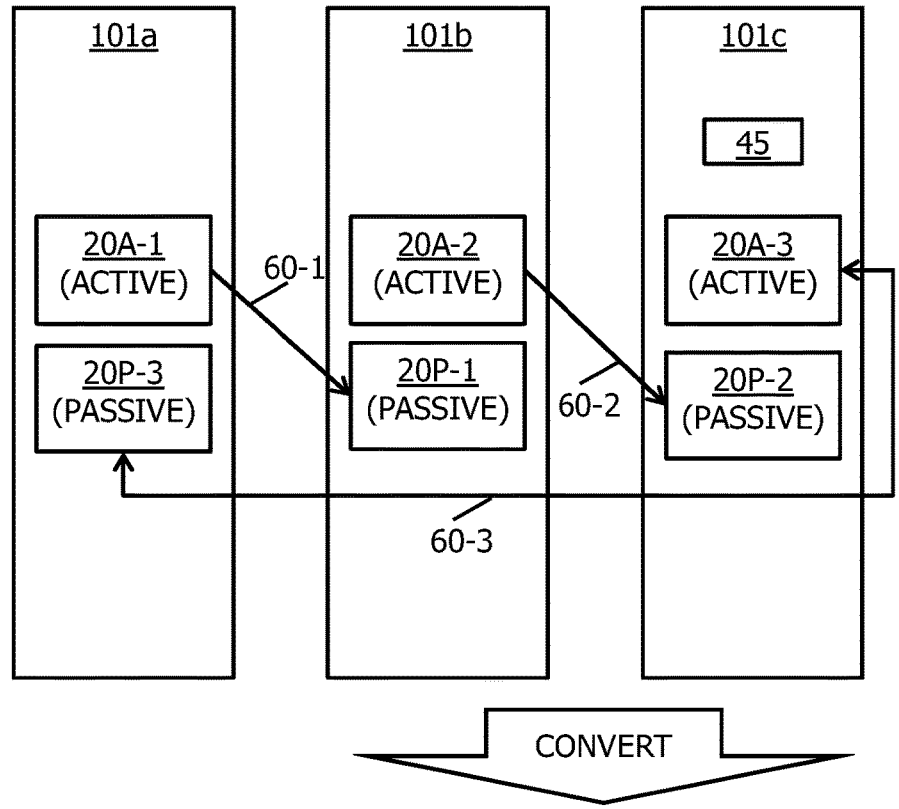
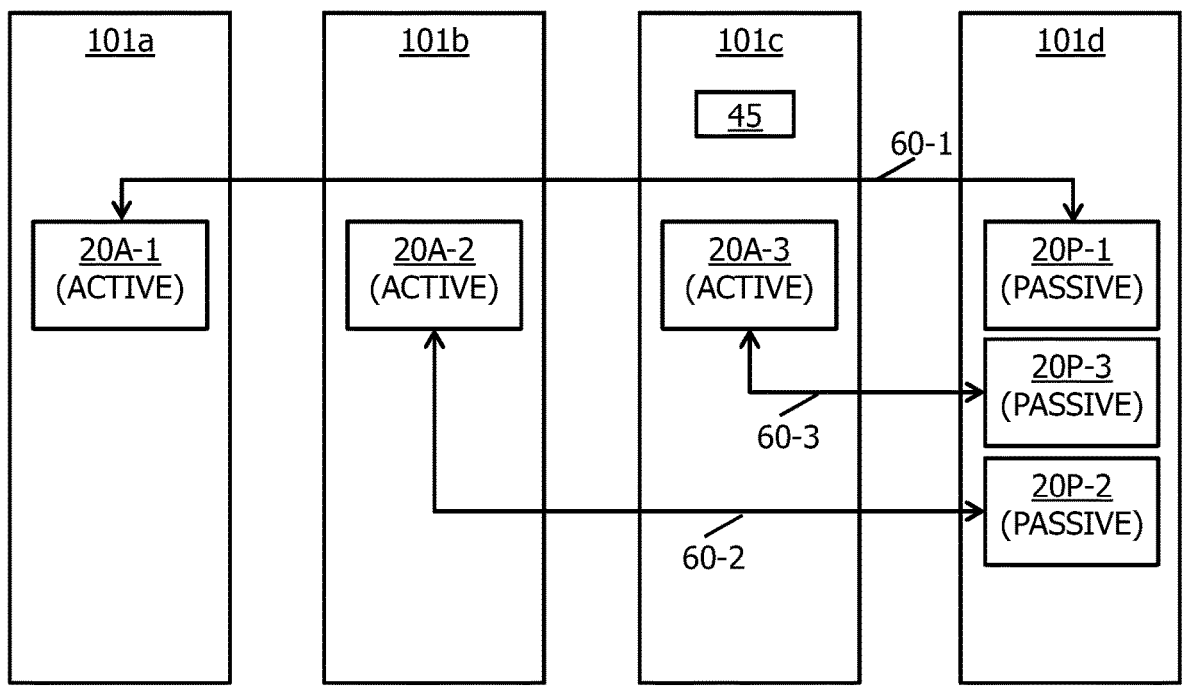

STORAGE SYSTEM AND STORAGE CONTROL METHOD

CLAIM OF PRIORITY

The present application claims benefit of priority to Japanese Patent Application No. 2018-059091, filed on Mar. 26, 2018, the content of which is hereby incorporated by reference into this application.

BACKGROUND OF THE INVENTION

1. Field of the Invention

The present invention generally relates to storage control of a storage system constituted by a plurality of storage nodes.

2. Description of the Related Art

A scale-out type distributed computing system constituted by a plurality of computing nodes is known. JP-2014-075027-A discloses arrangement of an active virtual machine and a standby virtual machine each aggregated in separate physical servers.

Similarly, a storage system of a scale-out type, i.e., a scale-out type storage system constituted by a plurality of storage nodes is known. This type of storage system executes a control program, i.e., a program for performing input/output (I/O) to and from an associated logical storage area. It is preferable that this type of storage system achieves high availability and high performance.

The system disclosed in JP-2014-075027-A (hereinafter referred to as conventional system) is expected to achieve high availability and high performance. More specifically, with the active virtual machine and the standby virtual machine both provided, failover from the active virtual machine to the standby virtual machine is achievable. Accordingly, availability is expected to increase. Moreover, with the active virtual machine and the standby virtual machine arranged in separate physical servers, a resource amount usable by the active virtual machine is not consumed by the standby virtual machine. Accordingly, performance is also expected to increase.

It has been therefore investigated to apply program arrangement of the conventional system to program arrangement of a scale-out type storage system.

According to the conventional system, however, no consideration is given to failover caused between a plurality of virtual machines. A scale-out type storage system is constituted by a large number of virtual machines. In this case, failover is caused between a plurality of the virtual machines, wherefore a plurality of standby virtual machines may be switched to active.

Under these circumstances (or for other or additional reasons), sufficient performance of the storage system may be difficult to achieve even with simple application of the conventional system to the scale-out type storage system.

SUMMARY OF THE INVENTION

A storage system provided according to an aspect of the present invention includes: a plurality of storage nodes each of which includes one or more processors; and one or more storage devices each of which stores data. The plurality of storage nodes each include two or more program clusters that include a plurality of control programs each of which operates on at least one of the one or more processors. Each of the control programs is a program for performing input and output to and from a storage area associated with the corresponding control program. Each of the two or more program clusters includes an active control program, and a passive control program that becomes active in place of the active control program. A processing resource of the processor is more used by the control programs in an active state than in a passive state. The active control program and the passive control program included in a same program cluster are each arranged in the storage nodes different from each other. Each of the plurality of storage nodes is configured to include a plurality of the active or passive control programs. When any one of the plurality of the passive control programs is switched to active, a change of an operation status is made for a different passive control program operating in the storage node that includes the passive control program switched to active.

According to the present invention, an active control program and a passive control program are appropriately arranged in a scale-out type storage system to effectively utilize resources.

BRIEF DESCRIPTION OF THE DRAWINGS

FIG. 8 illustrates a configuration of a control program management table;

FIG. 9 illustrates a configuration of a node management table;

FIG. 10 illustrates a configuration of a resource allocation management table;

FIG. 11 illustrates a configuration of a physical chunk management table corresponding a part of a configuration table;

FIG. 12 illustrates a configuration of a logical chunk management table corresponding a remaining part of the configuration table;

FIG. 21 illustrates a configuration of a node management table according to the third embodiment;

FIG. 23 schematically illustrates an outline of a fourth embodiment;

DESCRIPTION OF THE PREFERRED EMBODIMENTS

Figure 1:
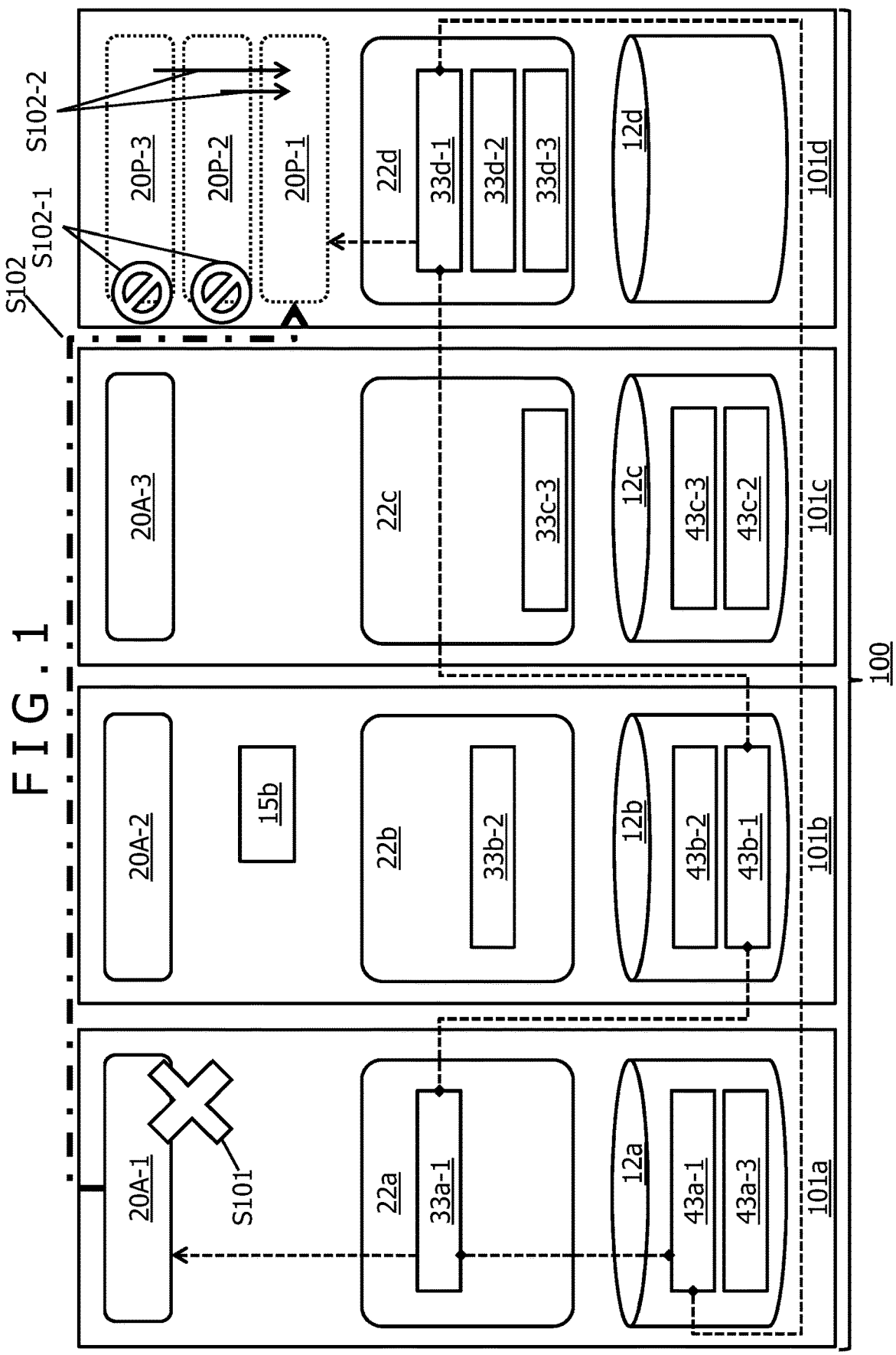
FIG. 1 schematically illustrates an outline of a first embodiment.

In the following description, an "interface unit" may be constituted by one or more interfaces. The one or more interfaces may be one or more communication interface devices of the same type (e.g., one or more network interface cards (NICs), or two or more communication interface devices of different types (e.g., NIC and host bus adapter (HBA)).

In the following description, a "memory unit" may be constituted by one or more memories, typically one or more main storage devices. At least one of the memories included in the memory unit may be a volatile memory or non-volatile memory.

In the following description, a "physical storage device (PDEV)" unit may be constituted by one or more PDEVs, typically one or more auxiliary storage devices. The "PDEV" refers to a physical storage device, typically a non-volatile storage device such as a hard disk drive (HDD) and a solid state drive (SSD). Accordingly, the PDEV unit is an example of a storage device unit.

In the following description, a "storage unit" is constituted by at least either the memory unit or the PDEV unit (typically at least memory unit).

In the following description, a "processor unit" is constituted by one or more processors. At least one of the processors may be typically a microprocessor such as central processing unit (CPU), or other types of processor such as a graphics processing unit (GPU). At least one of the processors may be a single core or a multi core. At least one of the processors may be a processor in a broad sense, such as a hardware circuit which performs a part or all of processing (e.g., field-programmable gate array (FPGA) or application specific integrated circuit (ASIC)).

In the following description, information which shows output in correspondence with input is expressed as "xxx table" or the like in some cases. However, this type of information may be constituted by data having any structure, or a learning model such as a neural network which generates output in correspondence with input. Accordingly, the "xxx table" can be expressed as "xxx information." In the following description, each configuration of tables is presented only by way of example. One table may be divided into two or more tables, or all or a part of two or more tables may be provided as one table.

In the following description, a "program" is a grammatical subject of a sentence which describes a process in some cases. However, a program is executed by the processor unit to perform a determined process while appropriately using the storage unit and/or the interface unit, for example. Accordingly, the processor unit (or device such as controller including this processor unit) may be the grammatical subject of the process. The program may be installed in a device such as a computer from a program source. The program source may be a recording medium (e.g., non-transitory recoding medium) readable by a program distributing server or a computer, for example. In the following description, two or more programs may be implemented as one program, or one program may be implemented as two or more programs.

In the following description, a "kkk unit" (excluding interface unit, storage unit, and processor unit) expresses a function in some cases. However, a function may be implemented by the processor unit under one or more computer programs, or implemented by one or more hardware circuits. Each description of functions is presented only by way of example. A plurality of functions may be unified into one function, or one function may be divided into a plurality of functions.

In the following description, a "storage system" is a system including a plurality of storage nodes. The storage system may be typically referred to as a scale-out type storage system, or a distributed storage system. A "storage node" is a device functioning as a member of the storage system, and may be constituted by either a general-purpose computer, or a dedicated computer (e.g., storage device known as disk array device including a plurality of PDEVs). The storage system may include a redundancy configuration group. The redundancy configuration may be either a configuration constituted by a plurality of storage nodes, such as erasure coding, redundant array of independent nodes (RAIN), and mirroring between nodes, or a configuration constituted by a single computer (e.g., storage node), such as one or more redundant array of independent (or inexpensive) disks (RAID) groups constituting at least a part of the PDEV unit.

In the following description, a "dataset" is a set of logical electronic data as viewed from a program such as an application program, and may be any one of a record, file, key value pair, and tuple, for example. The dataset includes not only user data but also redundant codes in some cases.

A "program cluster" includes one or more active control programs, and one or more passive control programs. A ratio of the active control programs to the passive control programs included in each of the program clusters may be selected from one to one, one to multitude, multitude to one, and multitude to multitude. For simplifying the description, it is assumed hereinafter that the active control programs and the passive control programs are included at a ratio of one to one, and therefore that the program cluster is referred to as a "program pair."

In the following description, elements of the same type are each expressed by only a common part of reference signs of these elements in some cases when no distinction is needed between the respective elements in the description. On the other hand, elements of the same type are each expressed by a whole reference sign in some cases when distinction is needed between the respective elements in the description. For example, when describing storage nodes without particular distinction therebetween, these nodes are expressed as "storage nodes 101." When distinction is needed between the nodes, the nodes are expressed in such a manner as "storage node 101a" and "storage node 101b" in some cases.

Several embodiments are hereinafter described.

First Embodiment

FIG. 1 schematically illustrates an outline of a first embodiment.

A storage system 100 includes a plurality of storage nodes (hereinafter referred to as nodes) 101 each include one or more PDEVs 12 (example of storage device). FIG. 1 shows nodes 101*a* to 101*d* by way of example. In the following description, a reference sign of an element included in a node α (α: small letter of English alphabet such as a and b) contains a in some cases. Based on the reference sign "α" of the element, the node to which the element belongs is recognizable.

Each of the plurality of nodes 101 includes two or more program pairs (example of program cluster) constituted by a plurality of control programs 20. Each of the control programs 20 is a program for performing input/output (I/O) to and from a logical chunk 33 (example of logical storage area) associated with the corresponding control program 20. Among the control programs 20, the control program 20 in an active state is hereinafter referred to as an "active control program 20A," and the control program 20 in a passive state is hereinafter referred to as a "passive control program 20P" in some cases.

Each of the program pairs is a pair constituted by the active control program 20A and the passive control program 20P (control program 20P which becomes active in place of corresponding active control program 20A when corresponding active control program 20A stops). The active control program 20A which belongs to a program pair β (β: natural number) is hereinafter referred to as an "active control program 20A-β," while the passive control program 20P which belongs to the program pair β is hereinafter referred to as a "passive control program 20P-β."

Each of the nodes 101 includes a redundancy unit 22 which provides the one or more logical chunks 33 in the corresponding node 101. Each of the PDEVs 12 includes a plurality of physical chunks 43 (example of physical storage area). Each of the logical chunks 33 in each of the nodes 101 is associated with the two or more physical chunks 43 included in the different two or more nodes 101. In the same program pair, the logical chunk 33 associated with the active control program 20A, and the logical chunk 33 associated with the passive control program 20P are associated with the same two or more physical chunks 43. In FIG. 1, the reference sign of the logical chunk associated with the control program 20 in the program pair β, and the reference sign of the physical chunk associated with the corresponding logical chunk each contain β. In this manner, the program pair including the control program 20 with which the logical chunk 33 is associated, and the logical chunk 33 with which the physical chunk 43 is associated are recognizable.

An arrangement of the plurality of control programs 20 is a separated arrangement. This separated arrangement is an arrangement formed in the following manner.

All the active control programs 20A in two or more program pairs are arranged in the storage nodes 101*a* to 101*c* constituting a part of the entire storage nodes. More specifically, all the active control programs 20A are equally distributed in the storage nodes 101*a* to 101*c* for load balancing, for example.

All the passive control programs 20P in two or more program pairs are arranged (aggregated) in the remaining storage node 101*d* (example of all or part of remaining storage nodes).

The example illustrated in FIG. 1 has a following configuration. All passive control programs 20P-1 to 20P-3 in all program pairs 1 to 3 are aggregated into the storage node 101*d*. An active control program 20A-1 paired with the passive control program 20P-1 to constitute the program pair 1 is arranged in the node 101*a*. A logical chunk 33*a*-1 provided by a redundancy unit 22*a* is associated with the active control program 20A-1. A logical chunk 33*d*-1 provided by a redundancy unit 22*d* is associated with the passive control program 20P-1 paired with the active control program 20A-1 to constitute the program pair 1. Physical chunks 43*a*-1 and 43*b*-1 are associated with each of the logical chunks 33*a*-1 and 33*d*-1. Accordingly, when either the logical chunk 33*a*-1 or 33*d*-1 becomes a write destination of a dataset corresponding to a write target, the dataset is duplicated, i.e., written to both the physical chunks 43*a*-1 and 43*b*-1.

At least the one node 101, such as each of the nodes 101, includes a cluster control unit 15 which manages a program pair. According to the present embodiment, the storage system 100 has a master-slave configuration. In the example illustrated in FIG. 1, the node 101*b* is a master, while the remaining nodes 101*a*, 101*c* and 101*d* are slaves. It is assumed that a cluster control unit 15*b* included in the master node 101*b* functions as a representative unit of the other cluster control units 15 (not shown).

It is assumed that each of the active control programs 20A can use a maximum resource amount of the node 101 which is an execution environment of the corresponding active control program 20A. It is also assumed that each of the passive control programs 20P in the node 101*d* receives allocation of only a minimum resource amount necessary for maintaining a passive state (standby state) so as to reduce time required for a failover process.

Suppose that a fault has been caused in the node 101*a* in this configuration (S101). The node 101*a* includes the active control program 20A-1, wherefore a failover process is performed from the active control program 20A-1 to passive control program 20P-1 (S102). In the failover process, the cluster control unit 15*b* stops at least a part of the passive control programs 20P other than the passive control program 20P-1 corresponding to failover destination, such as all the passive control programs 20P-2 and 20P-3 (S102-1) Subsequently, the cluster control unit 15*b* specifies processing resources released as a result of the stop of the passive control programs 20P-2 and 20P-3, and instructs the node 101*d* to allocate at least a part of the specified processing resources to the passive control program 20P-1. In response to this instruction, the processing resources released from the passive control programs 20P-2 and 20P-3 are allocated to the passive control program 20P-1. As a result, the resource amount usable by the passive control program 20P-1 increases (S102-2).

According to the present embodiment, each of the logical chunks 33 provided in each of the nodes 101 is associated with the two or more physical chunks 43 included in the different two or more nodes 101. In the same program pair, the logical chunk 33 associated with the active control program 20A, and the logical chunk 33 associated with the passive control program 20P are associated with the same two or more physical chunks 43. Accordingly, the active control program 20A and the passive control program 20P are allowed to be arranged in the separate nodes 101 in the scale-out type storage system 100. For example, even in a state that the same resource amount is allocated to the node 101*a* corresponding to a failover source and the node 101*d* corresponding to a failover destination, and that the active control program 20A-1 uses 100% of the resource amount in the node 101*a*, the control program 20P-1 which becomes active in place of the active control program 20A-1 can securely use a resource amount equivalent to the resource amount used by the active control program 20A-1 because the node 101*d* does not include the active control program 20A. Accordingly, the scale-out type storage system 100 which distributes data in the PDEVs 12 as local devices between the nodes 101 achieves high availability and high performance.

The stop of the passive control programs 20P-2 and 20P-3 is an example of a change of an operation status of the passive control programs 20P-2 and 20P-3. Other examples of the change of the operation status of the passive control programs 20P-2 and 20P-3 include a migration of the passive control programs 20P-2 and 20P-3 to the different node 101 as will be described in a second embodiment.

The present embodiment is hereinafter detailed.

Figure 2:
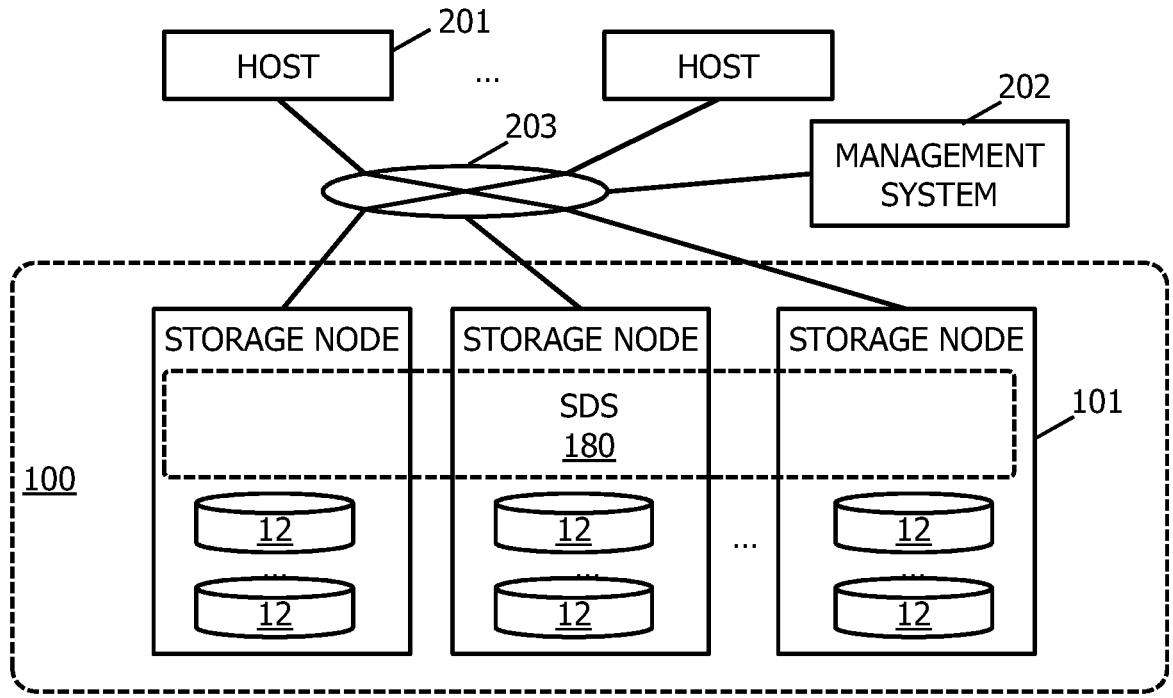
FIG. 2 illustrates a configuration of a whole system including a storage system.

FIG. 2 illustrates a configuration of a whole system including the storage system 100.

One or more host computers 201 as an example of a host system, the plurality of nodes 101 constituting the storage system 100, and a management system 202 are connected to a network 203. The network 203 may be constituted by one or more networks such as Fiber Channel, Ethernet (registered trademark), InfiniBand, local area network (LAN) or the like.

The host computer 201 is a computer (e.g., general-purpose computer) which transmits a read request or a write request (both may be collectively referred to as I/O requests) to the storage system 100. A virtual machine (VM) executed by at least one physical computer may function as the host computer 201.

The management system 202 is a computer system used by a system manager to manage the storage system 100 (or computer system including storage system 100 and host system). For example, the management system 202 is capable of monitoring performance of the storage system 100, or transmitting various types of instructions. A virtual machine executed by at least one physical computer may function as the management system 202.

The storage system 100 is constituted by the plurality of nodes 101 each including the one or more PDEVs 12. The storage system 100 function as a base of a software defined storage (SDS) 180 constructed by software including a storage function and executed by respective general-purpose computers (nodes 101). The SDS 180 may be individually constructed for each of the nodes 101. However, the SDS 180 according to the present embodiment is a device common to the plurality of the nodes 101.

In addition to the function as the base of the SDS 180, the storage system 100 may function as a base of a software defined host system, or may execute one or more virtual machines functioning as the host computers 201. In other words, the storage system and the host system may virtually exist on the same system infrastructure.

Figure 3:
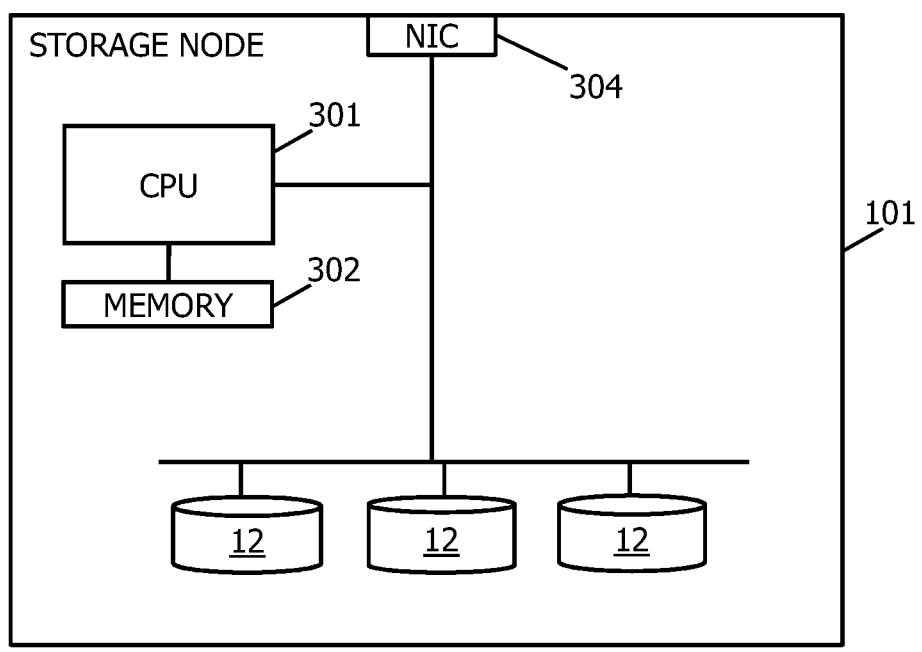
FIG. 3 illustrates a physical configuration of a node.

FIG. 3 illustrates a physical configuration of the node 101.

The node 101 may be a general-purpose computer. The node 101 includes a network interface card (NIC) 304, the PDEVs 12, a memory 302, and a CPU 301 connected to these components. A plurality of the NICs 304, the PDEVs 12, the memories 302, and the CPUs 301 may be provided. The NIC 304 is an example of the interface unit. Each of the PDEV 12 and the memory 302 is an example of the storage unit. The CPU 301 is an example of the processor unit.

The NIC 304 is an interface device connected to the network 203, and communicating with a device outside the node 101. The NIC 304 may be constituted by any one of Fiber Channel card, Ethernet (registered trademark) card, InfiniBand card, wireless LAN card, and peripheral component Interconnect (PCI) Express (PCIe) host adapter.

The PDEV 12 may be either an HDD or an SSD as described above, or may be a storage class memory (SCM). The PDEV 12 may be connected via any one of interfaces of non-volatile memory express (NVMe), serial attached small computer system interface (SCSI), i.e., serial attached SCSI (SAS), and serial advanced technology attachment (ATA), i.e., serial ATA (SATA). In addition, different types of PDEVs may be present in a mixed manner to function as a plurality of the PDEVs 12.

The memory 302 may be constituted by a volatile semiconductor memory, such as a static random access memory (RAM), i.e., static RAM (SRAM) and dynamic RAM (DRAM). The memory 302 is used to temporarily retain various programs and necessary data.

The CPU 301 executes programs in the memory 302 to control overall operations of the node 101.

In the node 101, the NIC 304, memory 302, and CPU 301 are examples of processing resources other than the storage device. Examples of the processing resources other than the storage device include the NIC 304, memory 302, and CPU 301. Examples of the resource amount include a communication bandwidth, memory amount, and CPU load (e.g., use rate, and number of used CPU cores (or number of free CPU cores)).

Figure 4:
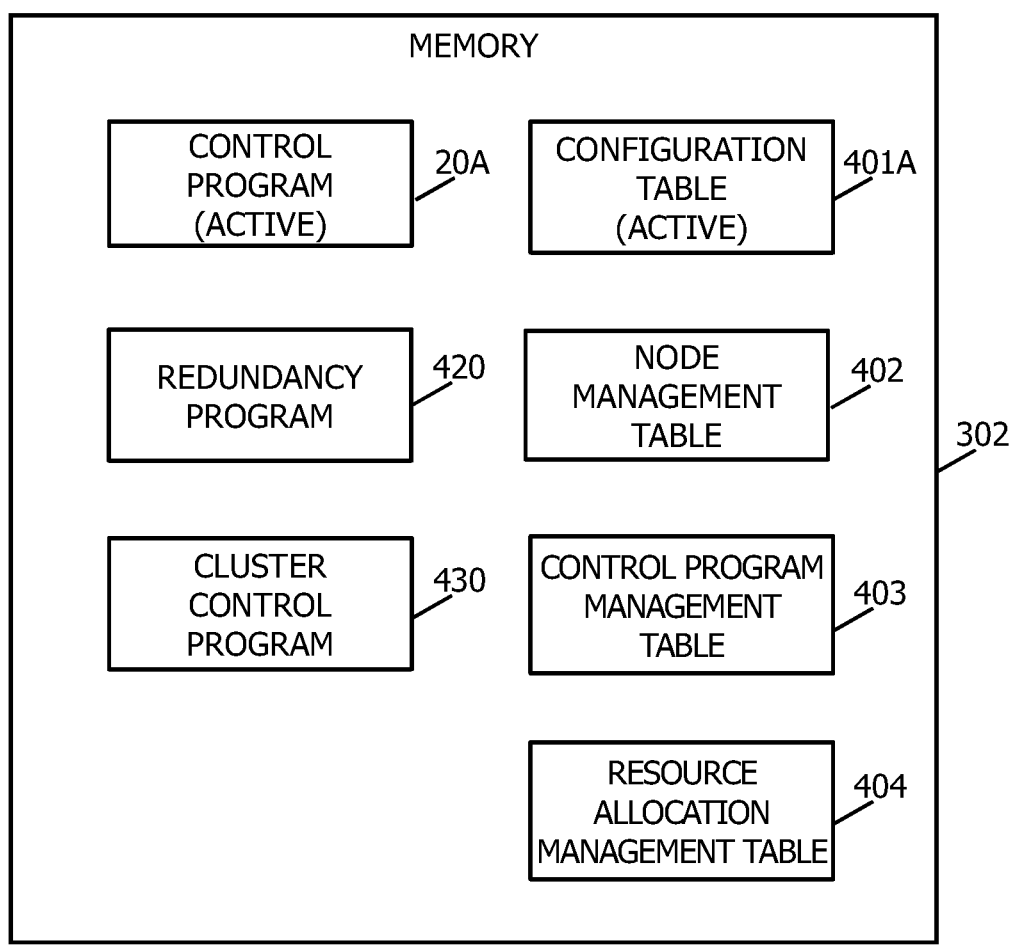
FIG. 4 shows typical programs and tables included in a memory within a node where an active control program is executed.

FIG. 4 shows typical programs and tables included in the memory 302 within the node 101 where the active control program 20A is executed.

The memory 302 stores the active control programs 20A, a redundancy program 420, a cluster control program 430, a configuration table 401A, a node management table 402, a control program management table 403, and a resource allocation management table 404.

The active control program 20A is a program which implements a function of the SDS 180 as a controller. The redundancy program 420 executed by the CPU 301 implements the redundancy unit 22. The cluster control program 430 executed by the CPU 301 implements the cluster control unit 15. Each of the programs 20, 420 and 430 may be a program for implementing a function as a component of the SDS 180. The cluster control unit 15 manages allocation of processing resources to the control programs 20 in the plurality of nodes 101. The cluster control unit 15 is configured to cause the passive control program 20P to stop or migrate, and/or determine the node 101 corresponding to a migration destination in case of migration of the passive control program 20P.

The configuration table 401 is present for each of the control programs 20. The configuration table 401 corresponding to the active control program 20A is referred to as a "configuration table 401A." According to the present embodiment, the one active control program 20A is executed by the one node 101, wherefore the one configuration table 401A corresponding to the one active control program 20A is present in the corresponding node 101. Each of the tables 401A to 404 will be detailed below.

Figure 5:
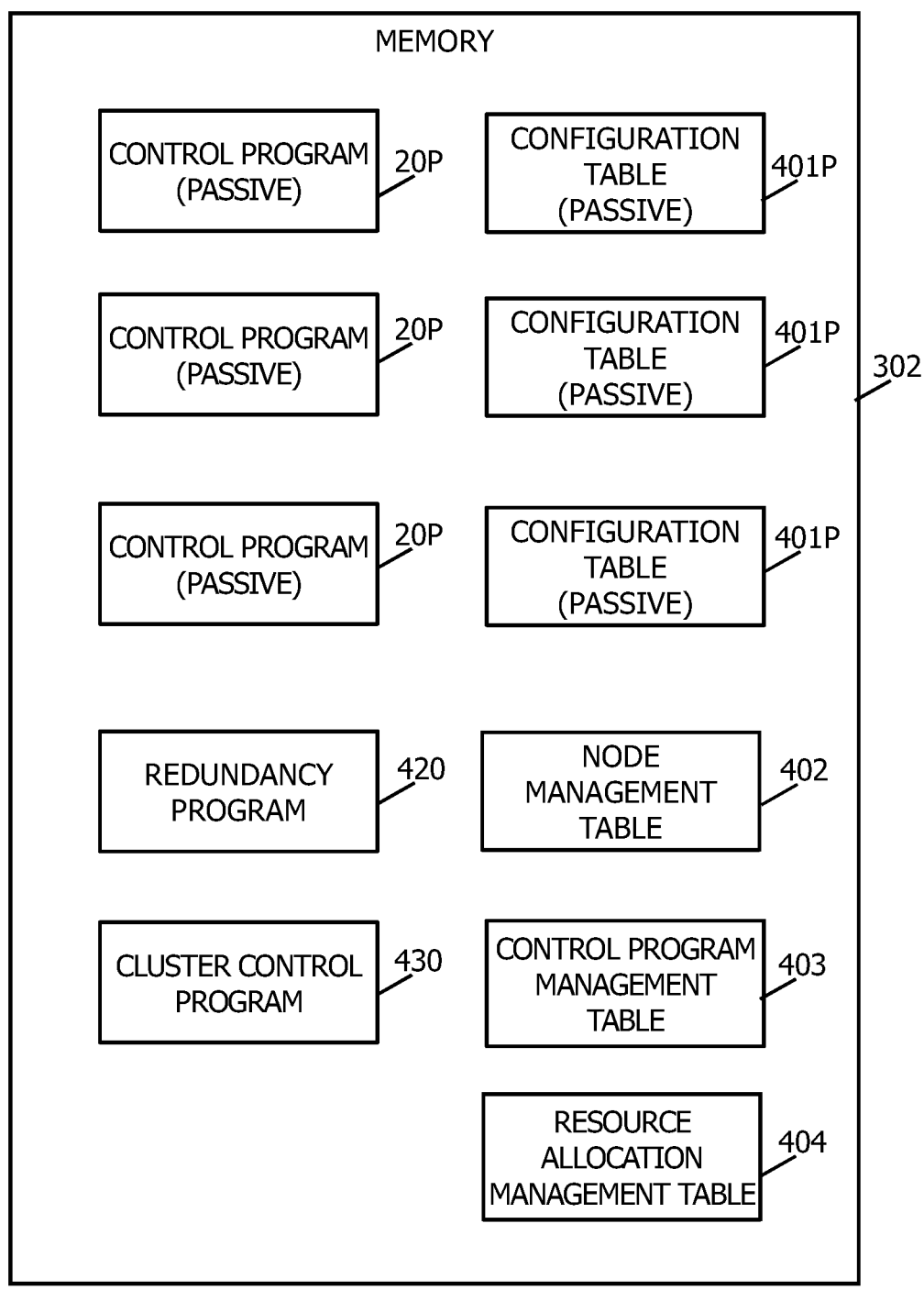
FIG. 5 shows typical programs and tables included in a memory within a node where a passive control program is executed.

FIG. 5 shows typical programs and tables included in the memory 302 within the node 101 where the passive control program 20P is executed.

The memory 302 stores the aggregated passive control programs 20P, and therefore stores a configuration table 401P for each of the passive control programs 20P. The configuration table 401P is the configuration table 401 corresponding to the passive control program 20P. The memory 302 further stores the programs 420 and 430 similar to the programs 420 and 430 in FIG. 4, and the tables 402 to 404 similar to the tables 402 to 404 in FIG. 4.

Figure 6:
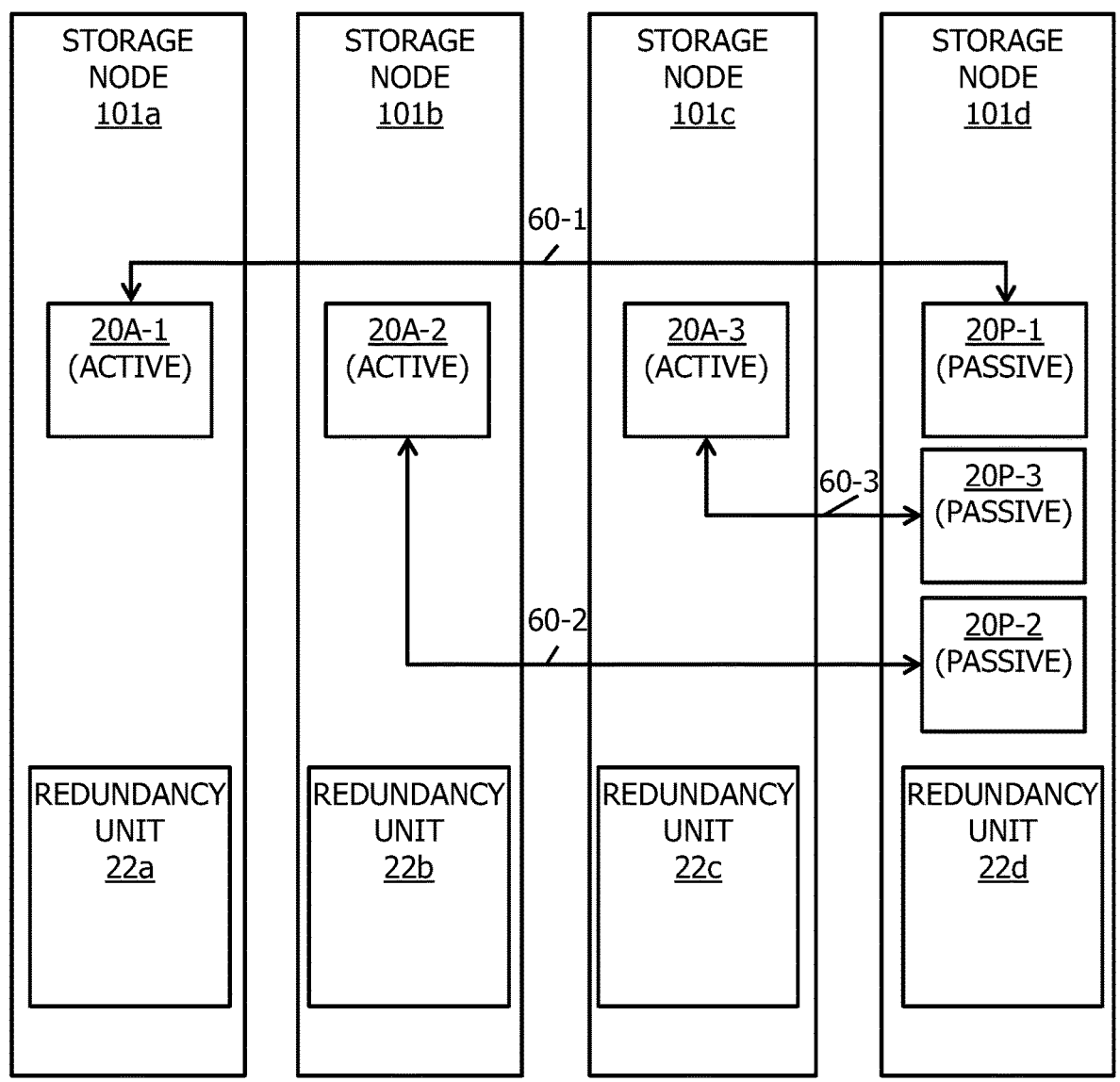
FIG. 6 illustrates an example of a control program arrangement.

FIG. 6 illustrates an example of a control program arrangement.

There are provided three program pairs 60-1 to 60-3. The program pair 60-1 is a pair of the active control program 20A-1 and the passive control program 20P-1. The program pair 60-2 is a pair of the active control program 20A-2 and the passive control program 20P-2. The program pair 60-3 is a pair of the active control program 20A-3 and the passive control program 20P-3.

The active control programs 20A-1 to 20A-3 are arranged in the nodes 101a to 101c, respectively. In other words, the active control programs 20A are provided in the nodes 101 with one-to-one correspondence. The two or more active control programs 20A are not included in the one node 101. Accordingly, a load is expected to be equally distributed.

On the other hand, the passive control programs 20P-1 to 20P-3 are aggregated in the one node 101d. When a fault is caused in any one of the nodes 101a to 101c, the passive control program 20P paired with the active control program 20A to constitute the program pair 60 in the node 101 causing the fault becomes a failover destination, and takes over processing. For implementing failover in this manner, each of the control programs 20 constituting the same program pair 60 is allowed to retain the configuration table 401 having the same contents.

Figure 7:
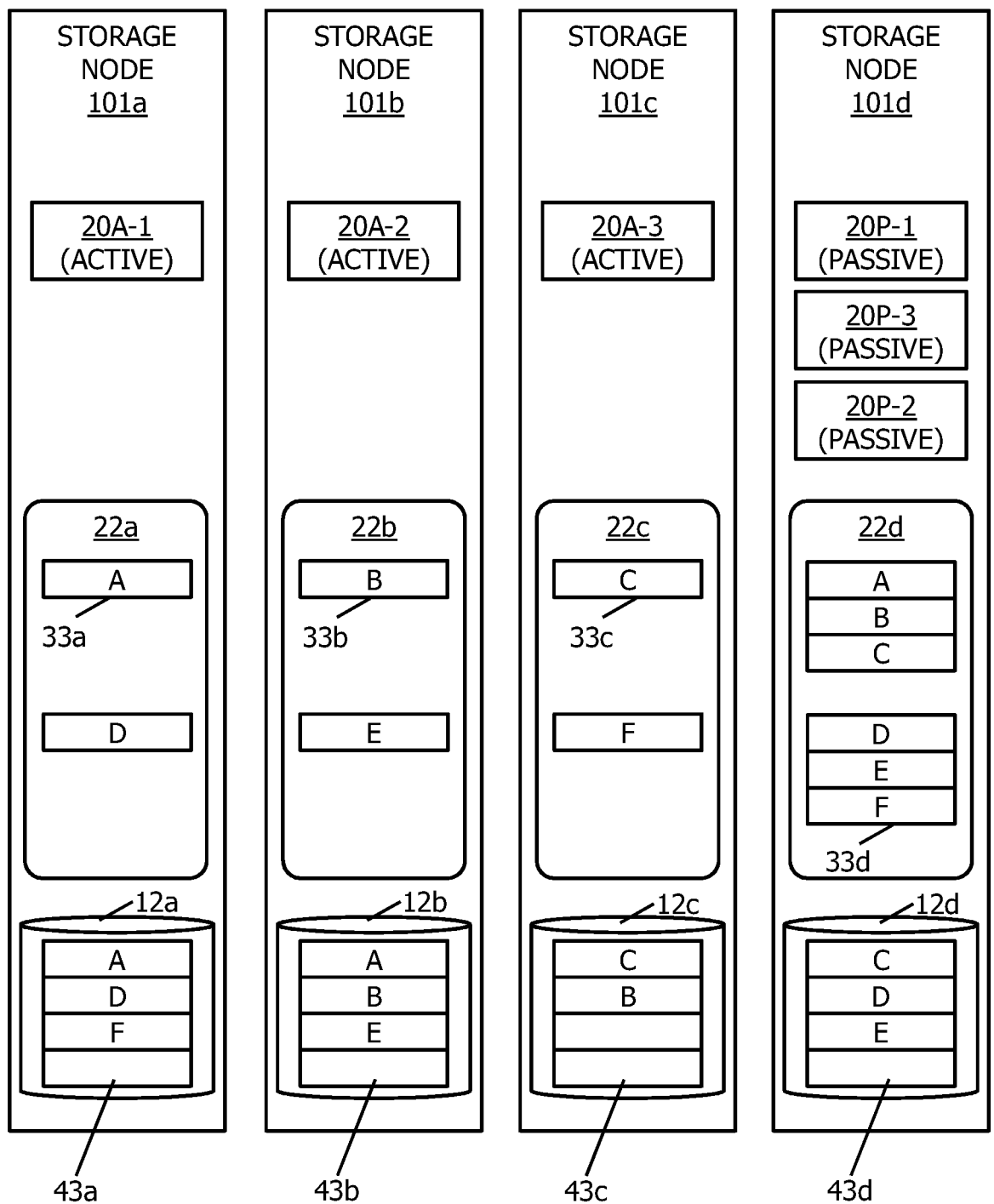
FIG. 7 shows an example of a relationship between logical chunks and physical chunks.

FIG. 7 shows an example of a relationship between the logical chunks and the physical chunks.

The redundancy unit 22 (e.g., redundancy unit 22a) in each of the nodes 101 (e.g., node 101a) provides the one or more logical chunks 33 (e.g., logical chunks A and D). The PDEV 12 (e.g., PDEV 12a) in each of the nodes 101 (e.g., node 101a) includes a plurality of the physical chunks 43 (e.g., a plurality of physical chunks 43a). Each of the logical chunks 33 (e.g., logical chunk A) is provided for the control program 20 associated with the corresponding logical chunk 33 (e.g., active control program 20A-1 in node 101a, or passive control program 20P-1 in node 101d). The redundancy unit 22 (e.g., redundancy unit 22a) in each of the nodes 101 (e.g., node 101a) associates the two or more physical chunks 43 (e.g., two physical chunks A in nodes 101a and 101b) in the two or more nodes 101 (typically two or more nodes 101 including corresponding node) with each of the one or more logical chunks 33 (e.g., logical chunk A). The relationship between the logical chunks 33 and the control programs 20, and the relationship between the logical chunks 33 and the physical chunks 43 are described in the configuration table 401. According to the example illustrated in FIG. 7, the two physical chunks 43 are associated with the one logical chunk 33. Accordingly, a dataset stored in the one logical chunk 33 is duplicated. In the following description, one of the two physical chunks 43 associated with each of the logical chunks 33 is referred to as the "master physical chunk 43," and the other physical chunk 43 is referred to as the "mirror physical chunk 43" in some cases for convenience. While duplication is adopted in the present embodiment, higher redundancy or Erasure Coding may be adopted rather than duplication.

For each of the P (p: natural number) logical chunks 33 in the plurality of nodes 101, the p master physical chunks 43 and the p mirror physical chunks 43 are equally distributed in the plurality of nodes 101.

For example, the p master physical chunks 43 are arranged in the following manner. The active control programs 20A-1 to 20A-3 are equally distributed in the nodes 101a to 101c. As a result, the p master physical chunks 43 are equally distributed in the nodes 101a to 101c. For each of the logical chunks 33, the master physical chunk 43 (e.g., master physical chunk A) is present in the node 101 (e.g., node 101a) including the corresponding logical chunk 33 (e.g., logical chunk A).

On the other hand, the p mirror physical chunks 43 are arranged in the following manner, for example. All the passive control programs 20P-1 to 20P-3 are aggregated in the node 101d, while the p mirror physical chunks 43 are equally distributed in the nodes 101a to 101d. More specifically, the logical chunks A to F are provided in the node 101d, for example, but the mirror physical chunks A to F corresponding to the logical chunks A to F are equally distributed in the nodes 101a to 101d. Accordingly, excessive increase in storage capacity consumption by the node 101d in comparison with those of the nodes 101a to 101c is avoidable. At least the one PDEV 12 in the node 101d may be left unused by equal distribution of the P mirror physical chunks 43 in the nodes 101a to 101c. In this case, the unused PDEV 12 included in the node 101d may be used as the PDEV 12 for recovery of redundancy at the time of a drop of redundancy of a dataset caused by a fault in any one of the nodes 101a to 101c (i.e., PDEV 12 receiving physical chunk corresponding to copy destination of master physical chunk 43 storing dataset causing drop of redundancy).

FIG. 8 illustrates a configuration of the control program management table 403.

The control program management table 403 retains information concerning the control programs 20. For example, the control program management table 403 is shared by the cluster control units 15 of all the nodes 101 (e.g., control program management table 403 is synchronized between all nodes 101). For example, the control program management table 403 shows an entry for each of the control programs 20. Each of the entries stores a control program #801, state 802, pair #803, operation node #804, use capacity 805, CPU load 806, use memory amount 807, use communication bandwidth 808, and the like. Described hereinafter by way of example is one of the control programs 20 ("target control program 20" in description with reference to FIG. 8).

The control program #801 indicates a number given to the target control program 20. The state 802 indicates a state of the target control program 20 (e.g., "active," "passive" or "dead") ("dead" indicates stop). The pair #803 indicates a number given to the program pair 60 including the target control program 20. The operation node #804 indicates a number given to the node 101 including the target control program 20. The use capacity 805 indicates a storage capacity used by the target control program 20 (e.g., capacities of all logical chunks associated with target control program 20). The CPU load 806 indicates a CPU load allocated to execute the target control program 20 (e.g., use rate or number of CPU cores). The use memory amount 807 indicates a memory capacity allocated to execute the target control program 20. The use communication bandwidth 808 indicates a communication bandwidth allocated to execute the target control program 20.

FIG. 9 illustrates a configuration of the node management table 402.

The node management table 402 retains information concerning the nodes 101. For example, the node management table 402 is retained by each of the cluster control units 15 of the respective nodes 101 (e.g., node management table 402 is synchronized between all nodes 101). For example, the node management table 402 shows an entry for each of the nodes 101. Each of entries stores a node #901, state 902, number of active control programs 903, number of passive control programs 904, maximum capacity 905, use capacity 906, CPU load 907, maximum memory amount 908, use memory amount 909, maximum communication bandwidth 910, use communication bandwidth 911, and the like. Described hereinafter byway of example is one of the nodes 101 ("target node 101" in description with reference to FIG. 9).

The node #901 indicates a number given to the target node 101. The state 902 indicates a state of the target node 101 (e.g., "normal" or "abnormal"). The number of active control programs 903 indicates the number of the active control programs 20A present in the target node 101. The number of passive control programs 904 indicates the number of the passive control programs 20P present in the target node 101. The maximum capacity 905 indicates a maximum storage capacity included in the target node 101. The use capacity 906 indicates a used storage capacity in the maximum storage capacity included in the target node 101. The CPU load 907 indicates a CPU load of the target node 101 (e.g., use rate, number of used CPU cores, or number of free CPU cores). The maximum memory amount 908 indicates a maximum memory amount included in the target node 101. The use memory amount 909 indicates a used memory amount in the maximum memory amount included in the target node 101. The maximum communication bandwidth 910 indicates a maximum communication bandwidth usable by the target node 101. The use communication bandwidth 911 indicates a used communication bandwidth in the maximum communication bandwidth of the target node 101.

When a frontend network connected to the host computer 201 is different from a backend network connected to the different node 101 in the network 203, the maximum communication bandwidth 910 and the use communication bandwidth 911 may be provided for each of the frontend network and the backend network.

FIG. 10 illustrates a configuration of the resource allocation management table 404.

The resource allocation management table 404 retains information concerning allocations of processing resources (typically processing resources other than PDEV 12). The resource allocation management table 404 may be different for each of the nodes 101. For example, the resource allocation management table 404 shows an entry for each of the control programs 20. Each of the entries stores information such as a control program #1001, a CPU core #1002, and a memory area 1003. Described hereinafter by way of example is one of the control programs 20 ("target control program 20" in description with reference to FIG. 10).

The control program #1001 indicates a number given to the target control program 20. The CPU core #1002 indicates a number given to a CPU core allocated to the target control program 20. The memory area 1003 indicates an address of a memory area allocated to the target control program 20. The memory area 1003 may further include information indicating a memory amount corresponding to a capacity of the memory area.

Based on the resource allocation management table 404, which resource has been released is recognizable in response to a stop of the target control program 20 (e.g., any one of passive control programs 20P), as well as a released resource amount. The resource allocation management table 404 may retain information indicating states (e.g., free or used) of all processing resources of the node 101 including the corresponding resource allocation management table 404.

Each of FIGS. 11 and 12 illustrates a configuration of the configuration table 401. More specifically, FIG. 11 illustrates a configuration of a physical chunk management table 1100 corresponding to a part of the configuration table 401. FIG. 12 illustrates a configuration of a logical chunk management table 1200 corresponding to the remaining part of the configuration table 401. For example, the configuration table 401 is retained by each of the redundancy units 22 of the respective nodes 101 (e.g., configuration table 401 is synchronized between all nodes 101). Based on the configuration table 401, the redundancy unit 22 in each of the nodes 101 can specify the control program 20 corresponding to a providing destination of the logical chunk 33, specify the two physical chunks 43 associated with the corresponding logical chunk 33, write a dataset to each of the specified two physical chunks 43 (duplication), and read a dataset from either one of the two specified physical chunks 43 (typically master physical chunk 43). The configuration table 401 may be dependent for each program pair.

As illustrated in FIG. 11, the physical chunk management table 1100 retains information concerning the physical chunks 43. For example, the physical chunk management table 1100 shows an entry for each of the physical chunks 43. Each of the entries stores a physical chunk #1101, parent node #1102, PDEV #1103, in-PDEV offset 1104, and the like. Described hereinafter by way of example is one of the physical chunks 43 ("target physical chunk 43" in description with reference to FIG. 11).

The physical chunk #1101 indicates a number given to the target physical chunk 43. The parent node #1102 indicates a number given to the node 101 including the target physical chunk 43. The PDEV #1103 indicates a number given to the PDEV 12 including the target physical chunk 43. The in-PDEV offset 1104 indicates an offset of the PDEV 12 including the target physical chunk 43 from a head address.

As illustrated in FIG. 12, the logical chunk management table 1200 retains information concerning the logical chunks 33. For example, the logical chunk management table 1200 shows an entry for each of the logical chunks 33. Each of the entries stores information such as a logical chunk #1201, control program #1202, master physical chunk #1203, and mirror physical chunk #1204. Described hereinafter by way of example is one of the logical chunk 33 ("target logical chunk 33" in description with reference to FIG. 12).

The logical chunk #1201 indicates a number given to the target logical chunk 33. The control program #1202 indicates a number given to the control program 20 associated with the target logical chunk 33 (in other words, control program 20 corresponding to allocation destination (providing destination) of the target logical chunk 33). The master physical chunk #1203 indicates a number given to the master physical chunk 43 associated with (allocated to) the target logical chunk 33. The mirror physical chunk #1204 indicates a number given to the mirror physical chunk 43 associated with the target logical chunk 33.

Hereinafter described is a process performed by the cluster control unit 15 (e.g., cluster control unit 15 in master node 101) according to the present embodiment.

Figure 13:
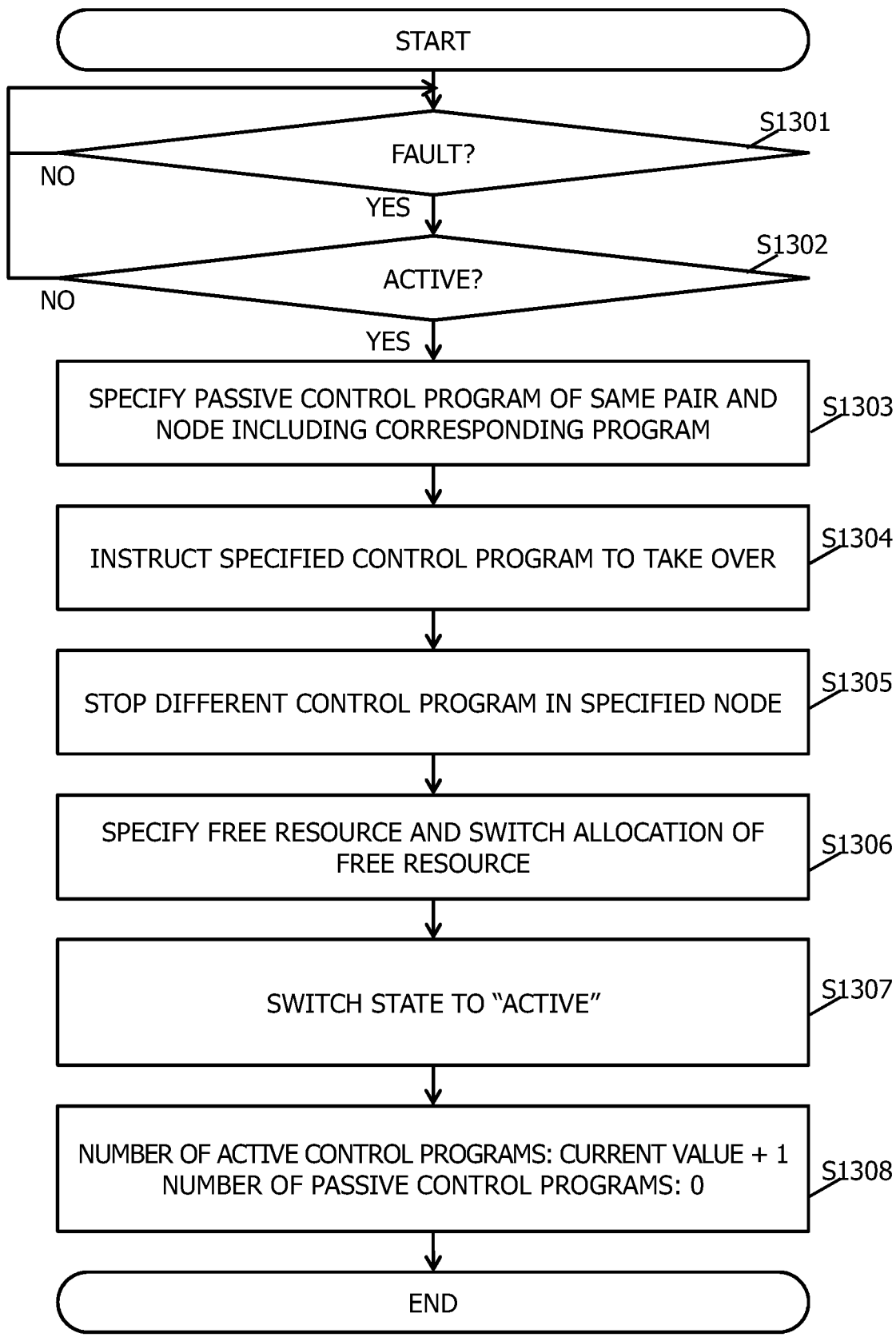
FIG. 13 shows a flow of a process performed by a cluster control unit according to the first embodiment.

FIG. 13 shows a flow of the process performed by the cluster control unit 15. In the following flow, at least a part of processing between the nodes 101 (e.g., S1304 to S1308) may be processing between the cluster control units 15 in the different nodes 101.

When a fault is caused in any of the nodes 101 other than the node 101 including the cluster control unit 15 (S1301: Yes), the cluster control unit 15 determines whether or not at least the one active control program 20A is present in the fault node 101 (node 101 causing fault) (whether or not value of the number of active control programs 903 corresponding to fault node 101 is "1" or more) based on the node management table 402 (S1302).

When a determination result is true in S1302 (S1302: Yes), failover is necessary. Accordingly, processing in S1303 to S1308 is performed. One of the active control programs 20A ("target active control program 20A" in description with reference to FIG. 13) is hereinafter described with reference to FIG. 13 by way of example.

The cluster control unit 15 specifies the passive control program 20P paired with the active control program 20A to constitute the same program pair 60, and the node 101 including the corresponding passive control program 20P based on the control program management table 403 (S1303). In the following description with reference to FIG. 13, the passive control program 20P specified in S1303 is referred to as the "failover destination program 20P," and the node 101 specified in S1303 is referred to as the "failover destination node 101."

The cluster control unit 15 gives the failover destination program 20P a notification of instruction to take over a process performed by the target active control program 20A (S1304). This notification may be given to the cluster control unit 15 of the failover destination node 101 such that the cluster control unit 15 can control takeover of the process.

The cluster control unit 15 stops all the passive control programs 20P other than the failover destination program 20P included in the failover destination node 101 (S1305). The stop of all the passive control programs 20P other than the failover destination program 20P is an example of a change of an operation status of at least the one passive control program 20P other than the failover destination program 20P.

The cluster control unit 15 specifies processing resources released (freed) as a result of the stop in S1305 based on the resource allocation management table 404, and switches the allocation destination of at least a part of all the specified processing resources to the failover destination program 20P (S1306). In other words, the resource allocation management table 404 within the node 101 including the cluster control unit 15 is updated in S1306.

The cluster control unit 15 switches the state 802 corresponding to the failover destination program 20P in the control program management table 403 to "active" (S1307). In other words, the control program management table 403 is updated in S1307. The updated control program management table 403 is synchronized between the respective nodes 101.

The cluster control unit 15 increments the number of active control programs 903 corresponding to the failover destination node 101 in the node management table 402 by "1," and also switches the number of passive control programs 904 corresponding to the failover destination node 101 to "0" (S1308). In other words, the node management table 402 is updated in S1308. The updated node management table 402 is synchronized between the respective nodes 101.

According to the example in FIG. 13, all the passive control programs 20P other than the failover destination program 20P included in the failover destination node 101 are stopped. This condition increases a possibility that the same resource amount as the resource amount allocated to the target active control program 20A is allocated to the failover destination program 20P.

According to the present embodiment, control of switching between the control programs 20 (failover), and management of resource allocation to the control programs 20 are also performed by the cluster control unit 15. (In addition, program pairs 60 are managed by cluster control unit 15). Accordingly, with a stop of any of the passive control programs 20, the cluster control unit 15 can specify a released processing resource, and switch the allocation destination of the specified resource to the failover destination program 20P.

In FIG. 13, the cluster control unit 15 may stop the passive control program 20P determined based on the resource amount allocated to the target active control program 20A, instead of the stop of all the passive control programs 20P other than the failover destination program 20P included in the failover destination node 101. More specifically, for example, the cluster control unit 15 may specify a processing resource allocated to the target active control program 20A based on the resource allocation management table 404, determine the passive control program 20P to be stopped to allocate a resource amount equal to or larger than X % (X: predetermined value falling within range 0<X≤100) of the resource amount of the specified processing resource to the failover destination program 20P based on the resource allocation management table 404, and stop the determined passive control program 20P. In this case, a part of the passive control program 20P may not be stopped even after the resource amount allocated to the failover destination program 20P is secured. Accordingly, high-speed failover is expected to be achieved even when a fault is also caused in the node 101 including the active control program 20A associated with the corresponding passive control program 20P.

According to the present embodiment, the physical chunks 43 may be allocated to the logical chunk 33 in at least one of the following manners.

First, as the two or more physical chunks 43 associated with the logical chunk 33, the redundancy unit 22 selects the two or more physical chunks 43 included in the two or more nodes 101 different from each other. In a comparative example, two or more physical chunks included in the same node are associated with one logical chunk. In this case, a dataset stored in the corresponding logical chunk is lost when a fault is caused in the corresponding node. However, this data loss is avoidable according to the present embodiment.

Second, as the two or more same physical chunks 43 associated with the two logical chunks 33 provided for the two control programs 20A and 20P constituting the same program pair 60, the redundancy unit 22 preferentially selects the two physical chunks 43 in the two nodes 101 including the control programs 20A and 20P. In this case, communication between at least the master physical chunks in the respective nodes 101 is avoidable either before or after failover at the time of I/O to and from the logical chunks 33.

Third, the redundancy unit 22 limits the total amount of the physical chunks 43 associated with the one or more logical chunks 33 in each of the nodes 101. In this case, depletion of the physical chunks 43 only in the particular node 101 is avoidable.

Second Embodiment

A second embodiment is now described. Differences from the first embodiment are chiefly described herein, and points in common with the first embodiment are not described or only briefly described.

Figure 14:
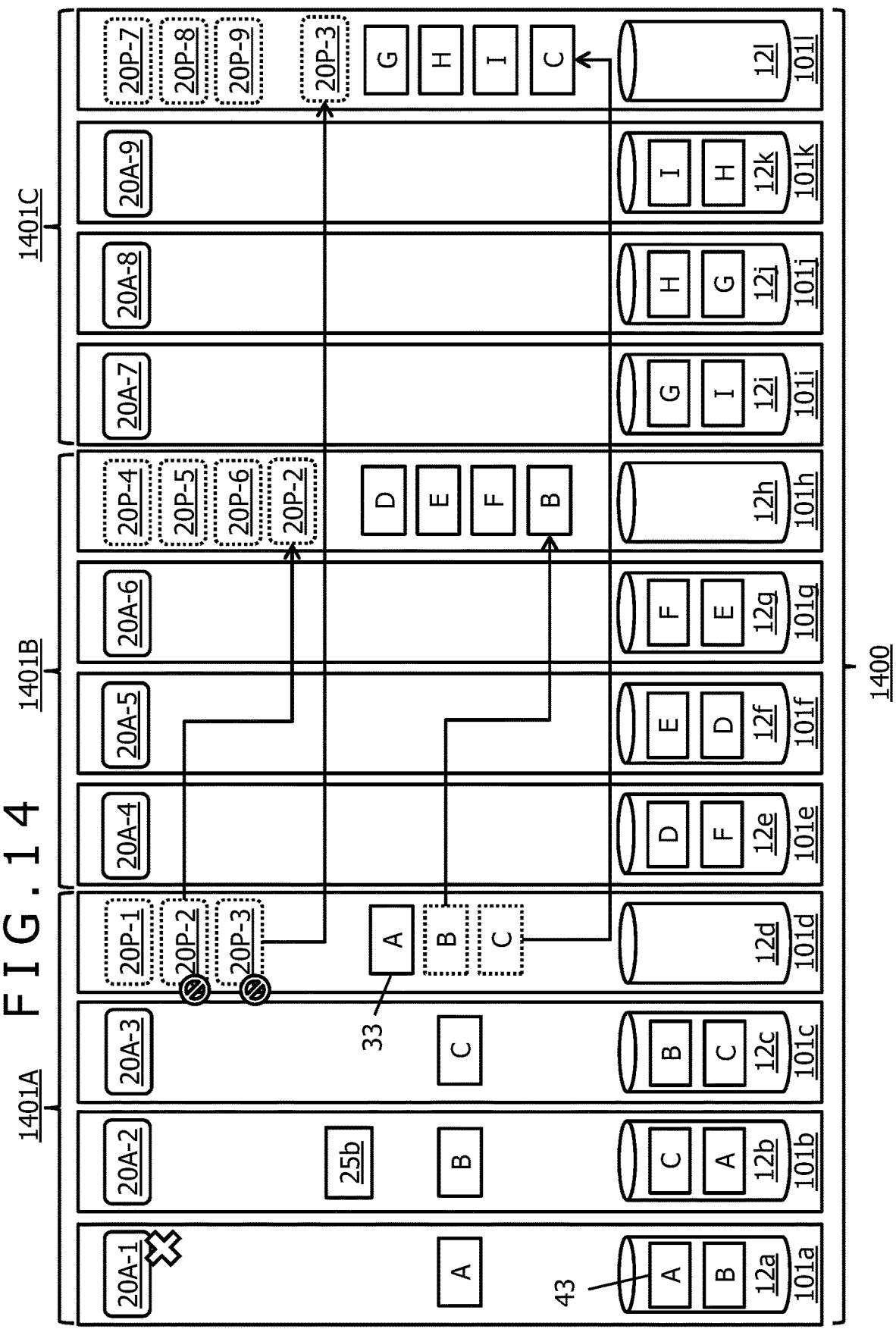
FIG. 14 schematically illustrates an outline of a second embodiment.

FIG. 14 schematically illustrates an outline of the second embodiment.

A storage system 1400 is constituted by two or more node groups 1401. Each of the node groups 1401 is constituted by the N (N: two or larger integer) nodes 101 where the N active control programs 20A are executed, and the m (m:

natural number and falling in range of m<N) nodes 101 where the N passive control programs 20P included in the N program pairs 60 each including the N active control programs 20A are aggregated. Accordingly, each of the node groups 1401 is the node group 1401 constituted by the (N+m) nodes (node group 1401 having (N+m) configuration). The value of N may differ, or the value of m may differ for each group of the node groups 1401. In the following description, each of the N nodes is referred to as an "active node," while each of the m nodes is referred to as a "passive node." According to the example illustrated in FIG. 14, N and m are set to 3 and 1, respectively, in each of the node groups 1401A to 1401C. More specifically, each of nodes 101a to 101c, nodes 101e to 101g, and nodes 101i to 101k is an active node. Each of nodes 101d, 101h, and 101l is a passive node.

According to the second embodiment, the stopped passive control program 20P migrates from the node 101 including the corresponding passive control program 20P to the different node 101 (e.g., different node 101 where passive control programs 20P are aggregated, or node 101 having extra resource amount). The cluster control unit 25 determines a storage node of a migration destination based on a use status of a processing resource included in the storage node of the migration destination and used by a node other than the passive control program. For example, the cluster control unit 25 determines the node 101 of the migration destination of the stopped passive control program 20P based on a use status of a processing resource of at least the one node 101 other than the node 101 where the passive control program 20P is present.

More specifically, suppose that a fault has been caused in the node 101a as illustrated in FIG. 14, for example. In this case, the cluster control unit 25 in any one of the different nodes 101 in the node group 1401 including the node 101a, such as a cluster control unit 25b in the node 101b corresponding to a master node in the corresponding node group 1401 performs following processing. The cluster control unit 25b stops the passive control programs 20P-2 and 20P-3 other than the passive control program 20P-1 corresponding to the active control program 20A-1 in the node 101a. The cluster control unit 25b causes each of the stopped passive control programs 20P-2 and 20P-3 to migrate to the node 101 other than the node 101d including the corresponding programs 20P, and also causes the logical chunks 33 associated with the corresponding programs 20P to migrate to the migration destination node 101. The migration of the logical chunks 33 can be executed by the redundancy unit 22 called by the cluster control unit 25b. The migration destination node is typically the passive node 101h or 101l in the node group 1401B or 1401C other than the node group 1401A including the node 101d. Even with the migration of the logical chunks 33, datasets within the logical chunks 33 do not migrate. This is because no change is made in the two physical chunks 43 associated with each of the logical chunks 33 before and after the migration. These processes by the cluster control unit 25 may be executed in a different order or in parallel.

According to the second embodiment, the stopped passive control programs 20P migrate to the different node 101. In this case, failover is performed for a fault caused later in the node 101 including the active control program 20A corresponding to the stopped passive control programs 20P (i.e., fault caused in different two or more nodes 101 with time difference). Accordingly, availability of the system is maintained with reduction of a possibility of shortage of resources in the failover destination at this time.

In addition, with the migration of the stopped passive control programs 20P to the different node 101, the logical chunks 33 associated with the corresponding passive control programs 20P similarly migrate to the same node 101. In this case, the passive control programs 20P caused to migrate are allowed to input or output datasets via the logical chunks associated with the corresponding programs, i.e., take over processing when the passive control programs 20P become active in the node 101 of the migration destination by failover. Accordingly, a condition that datasets included in the different node 101 (e.g., node 101 of migration source) are accessible by the passive control programs 20P from the node 101 of the migration destination even after the migration of the corresponding control programs 20 between the nodes 101 is dependent on the function of the redundancy unit 22 (and foregoing configuration table 401 managed by redundancy unit 22).

The two or more (N+m) node groups 1401 are not necessarily required. For example, when m is an integer equal to or larger than 2, the (N+m) node groups 1401 to be provided may be only one group.

The second embodiment is hereinafter detailed.

Figure 15:
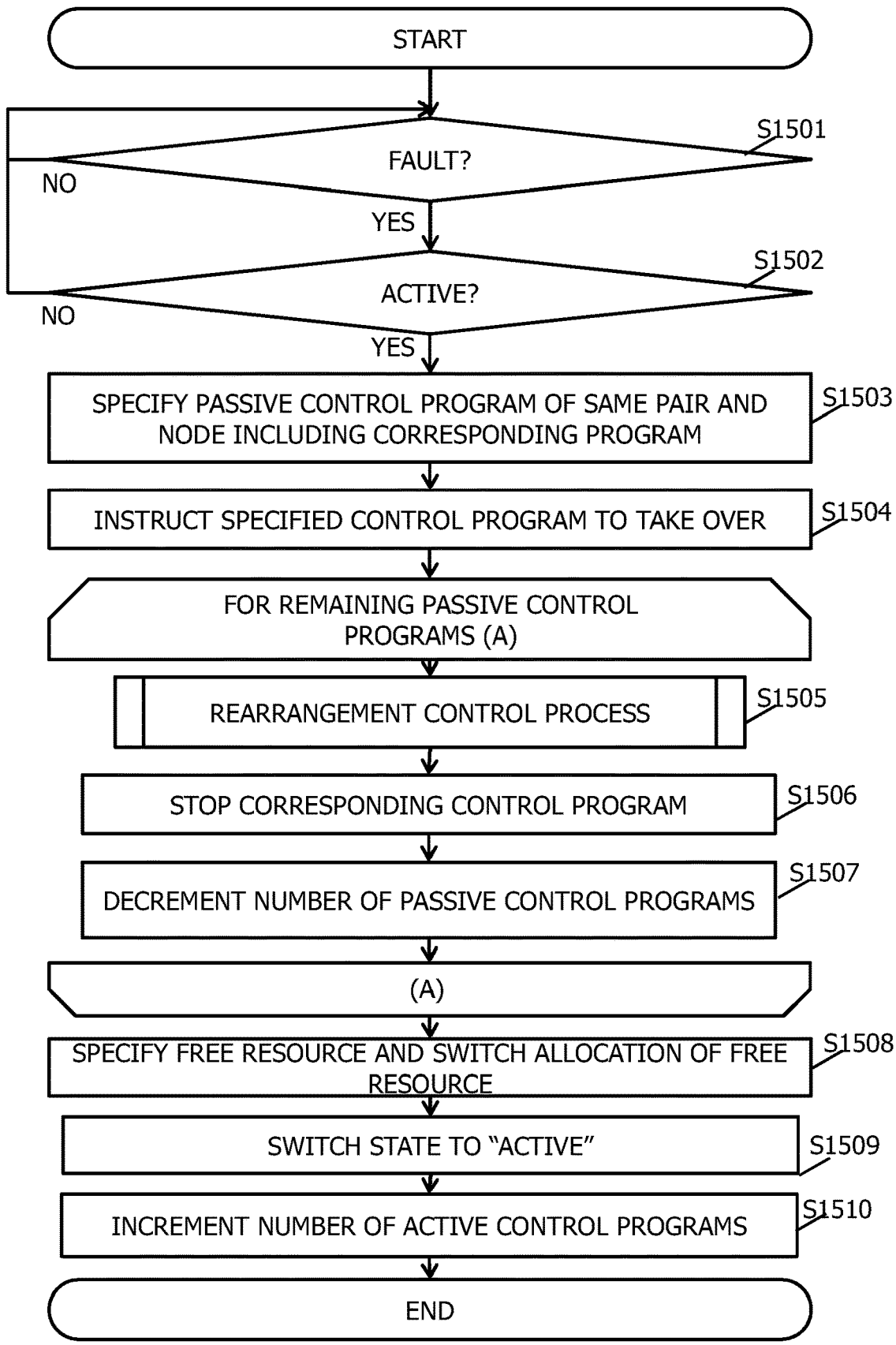
FIG. 15 shows a flow of a process performed by a cluster control unit according to the second embodiment.

FIG. 15 shows a flow of a process performed by the cluster control unit 25.

Processing in S1501 to S1504 are identical to the processing in S1301 to S1304 in FIG. 13. In the following description with reference to FIGS. 15 to 17, the terms "target active control program 20A," "failover destination program 20P," and "failover destination node 101" are used in some cases similarly to the description with reference to FIG. 13.

Processing in S1505 to S1507 is performed for all the passive control programs 20P other than the failover destination program 20P in the failover destination node 101. Described hereinafter by way of example is the one passive control program 20P ("target passive control program 20P" in description with reference to FIGS. 15 to 17).

The cluster control unit 25 performs a rearrangement control process for the target passive control program 20P (FIG. 16) (S1505). Subsequently, the cluster control unit 25 stops the target passive control program 20P (S1506), and decrements the number of passive control programs 904 corresponding to the failover destination node 101 by one (S1507).

After completion of processing in S1505 to S1507 for all the passive control programs 20P other than the failover destination program 20P, the cluster control unit 25 specifies processing resources released (freed) by a stop of the one or more passive control programs 20P based on the resource allocation management table 404, and switches an allocation destination of at least a part of all the specified processing resources to the failover destination program 20P (S1508). The cluster control unit 25 switches the state 802 corresponding to the failover destination program 20P to "active" (S1509), and increments the number of active control programs 903 corresponding to the failover destination node 101 by one (S1510).

According to the example illustrated in FIG. 15, the processing in S1505 to S1507 is performed for all the passive control programs 20P other than the failover destination program 20P. However, execution of the processing in S1505 to S1507 for all the passive control programs 20P other than the failover destination program 20P is only an example of a condition required for a loop end. Other conditions, such as release of a resource amount equal to or larger than the resource amount used by the target active control program 20A, may be adopted as a condition required for the loop end.

Figure 16:
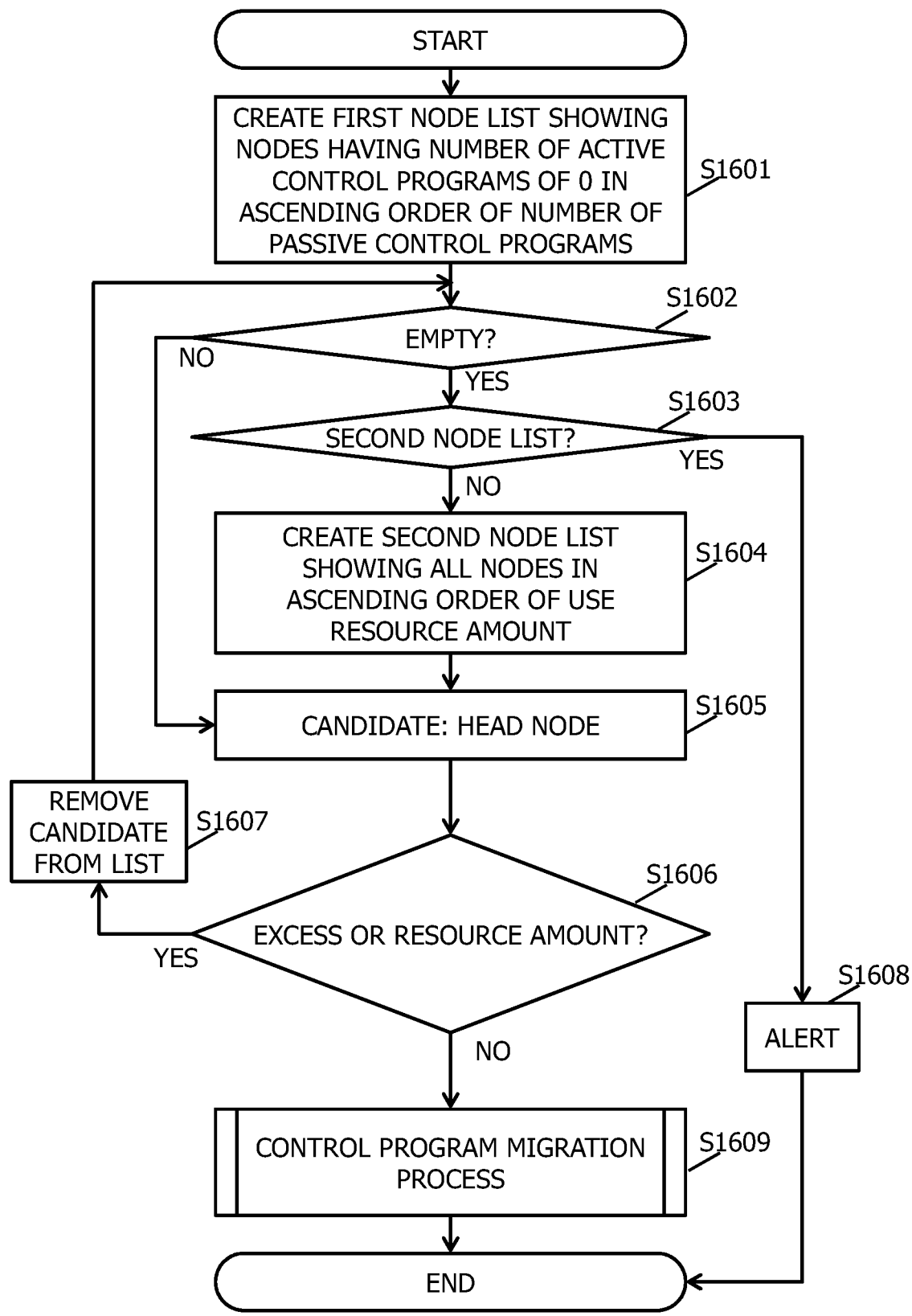
FIG. 16 shows a flow of a rearrangement control process according to the second embodiment.

FIG. 16 shows a flow of the rearrangement control process. For simplifying the following description, in each of the nodes 101, each of values indicated by the use capacity 906, CPU load 907, use memory amount 909, and use communication bandwidth 911 is collectively referred to as a "node use resource amount," and each of values indicated by the maximum capacity 905, a not-shown maximum CPU load (e.g., 100%), the maximum memory amount 908, and the maximum communication bandwidth 910 is referred to as a "node maximum resource amount" in some cases. In addition, in each of the control programs 20, a resource amount of a processing resource allocated to (e.g., used by) the corresponding control program 20 is referred to as a "program resource amount" in some cases. For example, the program resource amount is at least one of a resource amount as a CPU load, a resource amount as a memory amount, and a resource amount as a communication bandwidth. According to the present embodiment, a migration of the logical chunk 33 between nodes is caused by a migration of the passive control program 20P between nodes, but a migration of a dataset in the corresponding logical chunk 33 between nodes is not caused. Accordingly, the use capacity 906 and the maximum capacity 905 may be excluded from the node use resource amount and the node maximum resource amount.

The cluster control unit 25 creates a list which shows the nodes 101 (node #) each having the number of active control programs 903 of "0" in an ascending order of the number of passive control programs 904 (i.e., increasing order of number of passive control programs 20P) (S1601). The node list created in S1601 is hereinafter referred to as a "first node list." A second node list described below is created as well as the first node list. A node list used for reference is referred to as a "reference target node list."

Suppose that at least the one node 101 is present in the first node list in S1601 (S1602: No).

The cluster control unit 25 designates the head node 101 shown in the reference target node list (first node list in this example) as the "candidate node 101" (S1605).

The cluster control unit 25 determines whether or not an excess of the resource amount is produced by a migration of the target passive control program 20P to the candidate node 101 (i.e., whether or not excess from node maximum resource amount of candidate node 101 is produced by addition of program resource amount of target passive control program 20P to node use resource amount of candidate node 101) based on the control program management table 403, node management table 402, and resource allocation management table 404 (S1606). At least the resource allocation management table 404 may be synchronized between all the nodes 101, or can be referred to during communication between the nodes 101.

When a determination result is false in S1606 (S1606: No), the candidate node 101 becomes the node 101 to be caused to migrate after the stop. The cluster control unit 25 performs a control program migration process (FIG. 17) for the corresponding candidate node 101 (S1609). After completion of this processing, the rearrangement control process (process in FIG. 16) for the target passive control program 20P ends. The candidate node 101 for which determination "No" is made in S1606 is referred to as the "migration destination node 101" in the description presented below with reference to FIG. 17.

When a determination result is true in S1606 (S1606: Yes), an excess of resources may be produced by a migration to the candidate node 101 corresponding to a migration destination. Accordingly, the cluster control unit 25 removes the candidate node 101 from the reference target node list (first node list) (S1607). Subsequently, the cluster control unit 25 determines whether or not the reference target node list is empty (no node # is shown) (S1602). When a determination result is false in S1602 (S1602: No), the cluster control unit 25 performs processing in and after S1605 while designating the current head node 101 as the candidate node 101.

When a determination result is true in S1602 (S1602: Yes), it is determined that an excess of resources may be produced by a migration of the target passive control program 20P to any of the nodes 101 each having the number of active control program 903 of "0" (i.e., any of passive nodes 101). Accordingly, the cluster control unit 25 creates a node list which does not restrict candidates of a migration destination to the nodes 101 each having the number of active control programs 903 of "0," i.e., shows all the nodes 101 other than the node 101 causing a fault in an ascending order of the node use resource amount (i.e., increasing order of node use resource amount) (S1604). The node list created in S1604 is a "second node list."

Thereafter, the cluster control unit 25 performs processing in and after S1605 with reference to the second node list as the reference target node list.

When the second node list also becomes empty (S1602: Yes, S1603: Yes), the cluster control unit 25 transmits an alert (e.g., message suggesting addition of node due to shortage of resource amount) to the management system 202 (S1608).

According to the example illustrated in FIG. 16, the node 101 having the smallest number of passive control programs 904 in the nodes 101 having the number of active control programs 903 of "0" may be preferentially selected as the migration destination node 101. In this case, a possibility of resource shortage is expected to become smallest at the time of failover performed for a later fault.

In addition, according to the example illustrated in FIG. 16, the node 101 which may be designated as a migration destination is also searched from the nodes 101 other than the nodes 101 each having the number of active control programs 903 of "0" when an excess of resources is produced by a migration to any migration destination selected from the nodes 101 each having the number of active control programs 903 of "0." In this case, a possibility of a migration of the target passive control program 20P increases without producing an excess of the resource amount.

Figure 17:
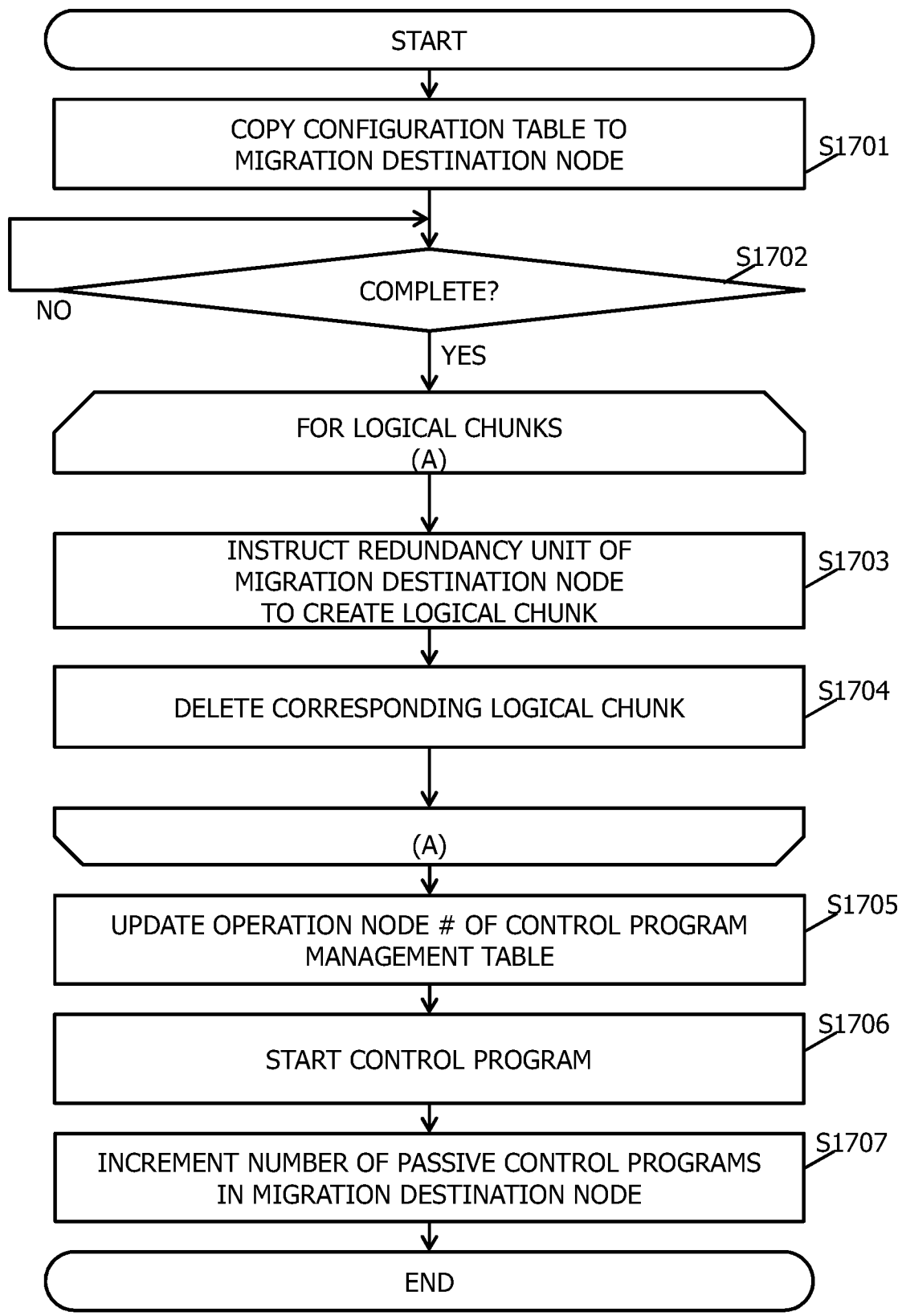
FIG. 17 shows a flow of a control program migration process.

FIG. 17 shows a flow of the control program migration process.

The cluster control unit 25 copies the configuration table 401 of the failover destination node 101 to the migration destination node 101 (S1701). In other words, the configuration table 401 is synchronized.

After completion of copying (S1702: Yes), the cluster control unit 25 performs processing in S1703 and S1704 for all of the logical chunks 33 associated with the target passive control program 20P. Described hereinafter by way of example is one of the logical chunks 33 ("target logical chunk 33" in description with reference to FIG. 17).

The cluster control unit 25 checks the physical chunks constituting the logical chunk 33 with reference to the logical chunk management table 1200, and instructs the redundancy unit 22 in the migration destination node 101 (hereinafter referred to as migration destination redundancy unit 22) to generate the logical chunk 33 associated with the same physical chunks (S1703). The migration destination redundancy unit 22 generates the target logical chunk 33 in response to the instruction. As a result, a new entry is added to the logical chunk management table 1200. The new entry corresponds to the generated target logical chunk 33 (i.e., logical chunk 33 associated with two physical chunks 43 associated with target logical chunk 33 in failover destination node 101). The target logical chunk 33 may be generated based on the configuration table 401 after copying (synchronization).

The cluster control unit 25 deletes the target logical chunk 33 from the failover destination node 101 (migration source node 101) (S1704). For example, an entry associated with the corresponding logical chunk 33 is deleted from the logical chunk management table 1200.

Processing in S1703 and S1704 is performed for all the logical chunks 33 associated with the target passive control program 20P. Thereafter, the cluster control unit 25 updates the operation node #804 corresponding to the target passive control program 20P to a number given to the migration destination node 101 (S1705). A migration of the control program 20 between the nodes is performed in S1705. The cluster control unit 25 starts processing for switching the state of the control program 20 caused to migrate to the migration destination node 101 to "passive" (S1706). The cluster control unit 25 increments the number of passive control programs 904 corresponding to the migration destination node 101 by one (S1707).

Third Embodiment

A third embodiment is now described. Differences from the first and second embodiments are chiefly described herein, and points in common with the first and second embodiments are not described or only briefly described.

Figure 18:
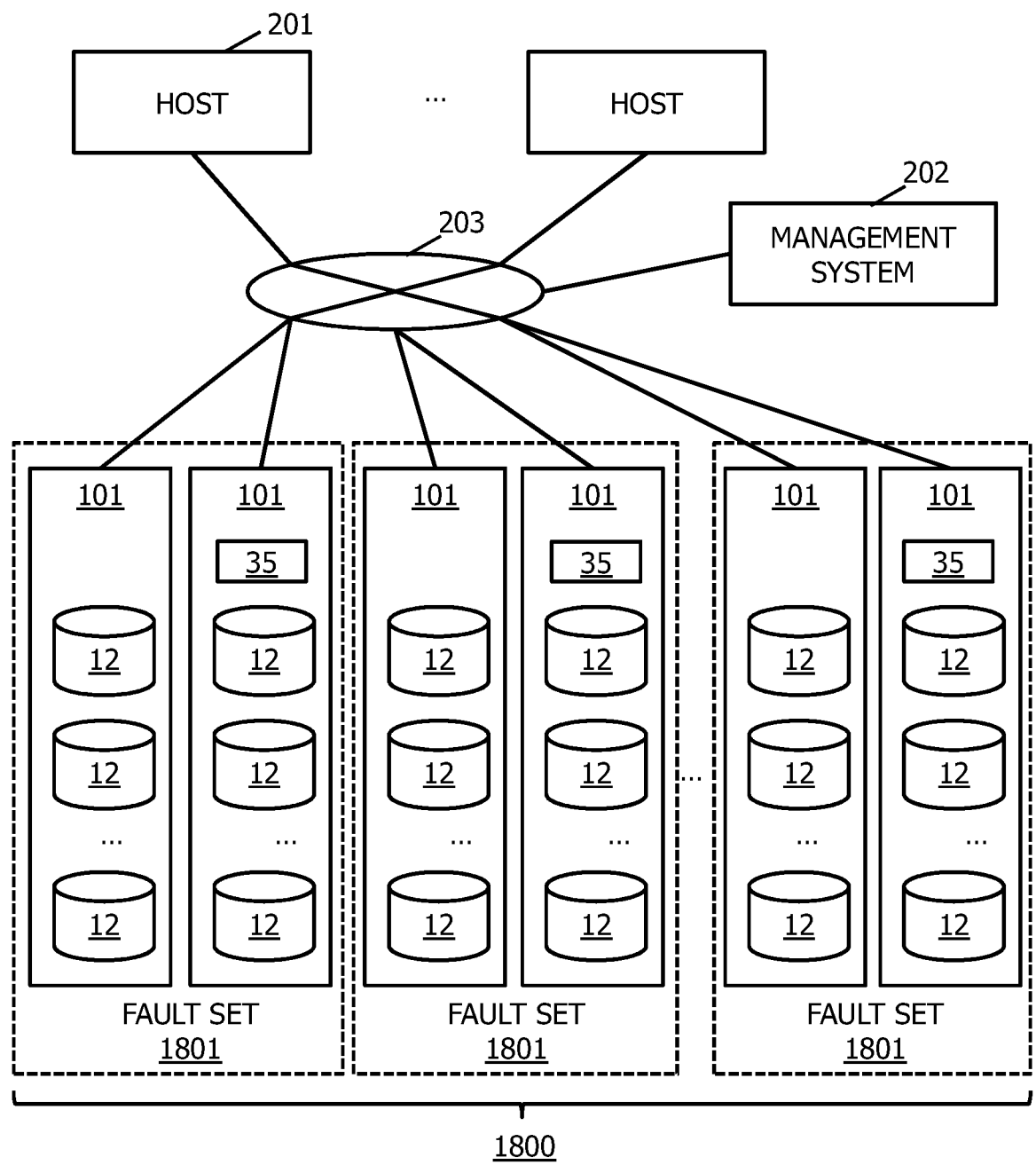
FIG. 18 illustrates a configuration of a storage system according to a third embodiment.

FIG. 18 illustrates a configuration of a storage system according to the third embodiment.

A storage system 1800 is constituted by a plurality of fault sets 1801. Each of the fault sets 1801 is an example of a single fault point common range, and is constituted by the one or more nodes 101 having the same single fault point. Examples of the single fault point include a power source. When a fault is caused in one of a plurality of power sources of the storage system 1800, a fault is also caused in each of a part of the plurality of nodes 101 constituting the storage system 1800. The one or more nodes 101 corresponding to the part of the nodes 101 are the nodes 101 belonging to the same fault set 1801. The nodes 101 belonging to the same fault set 1801 may be mounted on the same rack, for example.

At least one of the nodes 101 in each of the fault sets 1801 includes a cluster control unit 35. The migration destination node 101 selected by the cluster control unit 35 is such a node where the passive control program 20P caused to migrate belongs to the fault set 1801 different from the fault set 1801 including the corresponding active control program 20A.

The active control program 20A and the passive control program 20P of each of the program pairs 60 are each arranged in the two fault sets 1801 different from each other. Accordingly, even when a fault is caused in all the nodes 101 included in the same fault set 1801 by a certain single fault, the passive control program 20P corresponding to each of the active control programs 20A in all the nodes 101 causing the fault is present in any one of the different fault sets 1801. This configuration therefore maintains high availability.

Figure 19:
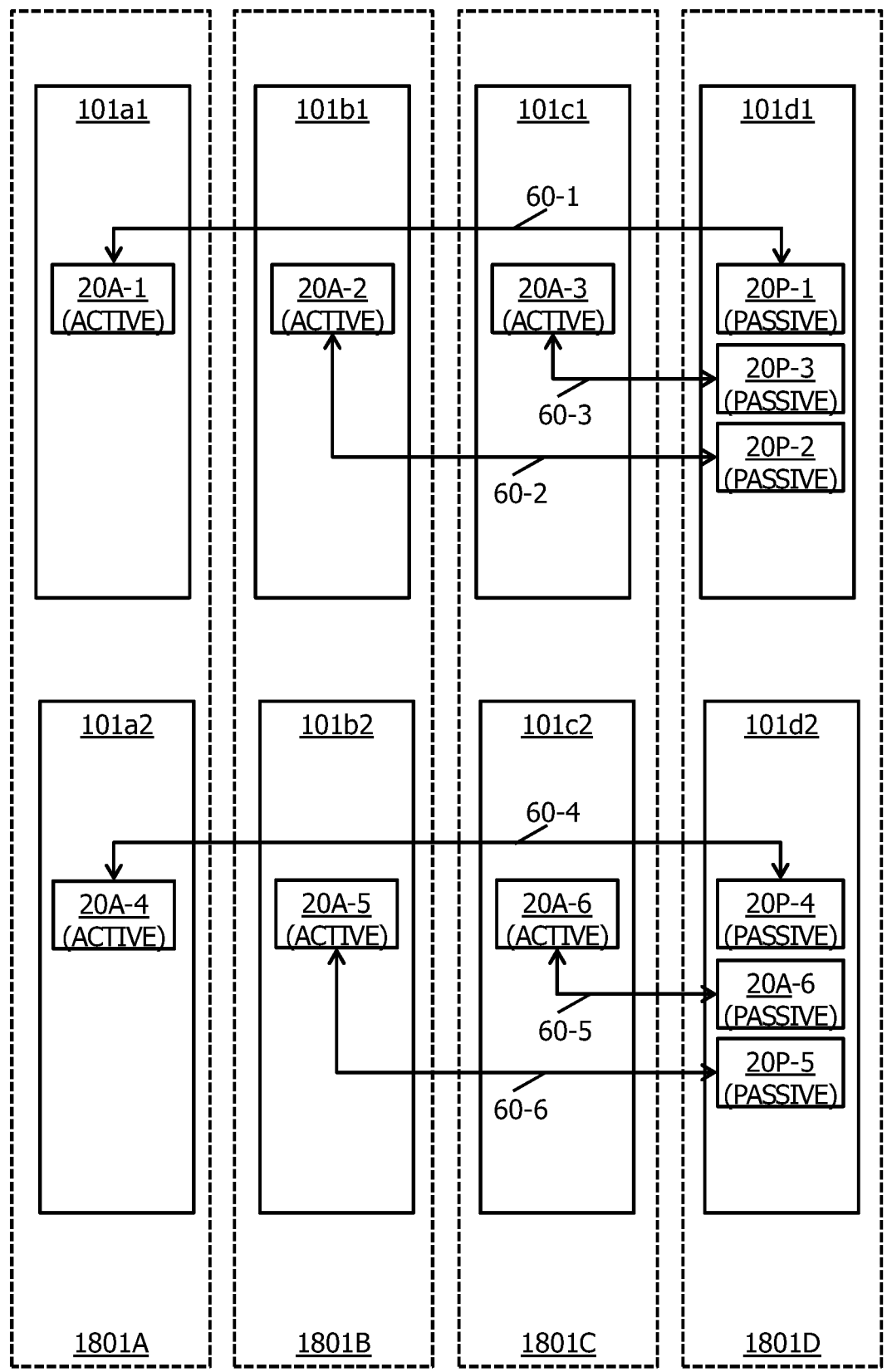
FIG. 19 illustrates a first example of a control program arrangement according to the third embodiment.

FIG. 19 illustrates a first example of a control program arrangement according to the third embodiment.

A plurality of (N+m) node groups are provided for a plurality of fault sets 1801A to 1801D. More specifically, in each of the (3+1) node groups, the three active nodes 101a, 101b, and 101c are present in the three fault sets 1801A to 1801C, respectively, while the one passive node 101d is present in the one fault set 1801D. Accordingly, each of the fault sets 1801A to 1801C is the fault set 1801 constituted by a collection of the one or more active nodes 101 (fault set not including passive node 101), while the fault set 1801D is the fault set 1801 constituted by a collection of the one or more passive nodes 101 (fault set not including active node 101).

According to this example, the active control program 20A and the passive control program 20P in each of program pairs 60-1 to 60-6 are arranged in the two different fault sets 1801 in units of (N+m) node group.

According to this example, addition to or removal from the fault sets 1801A to 1801D is allowed in units of (N+m) node group.

Figure 20:
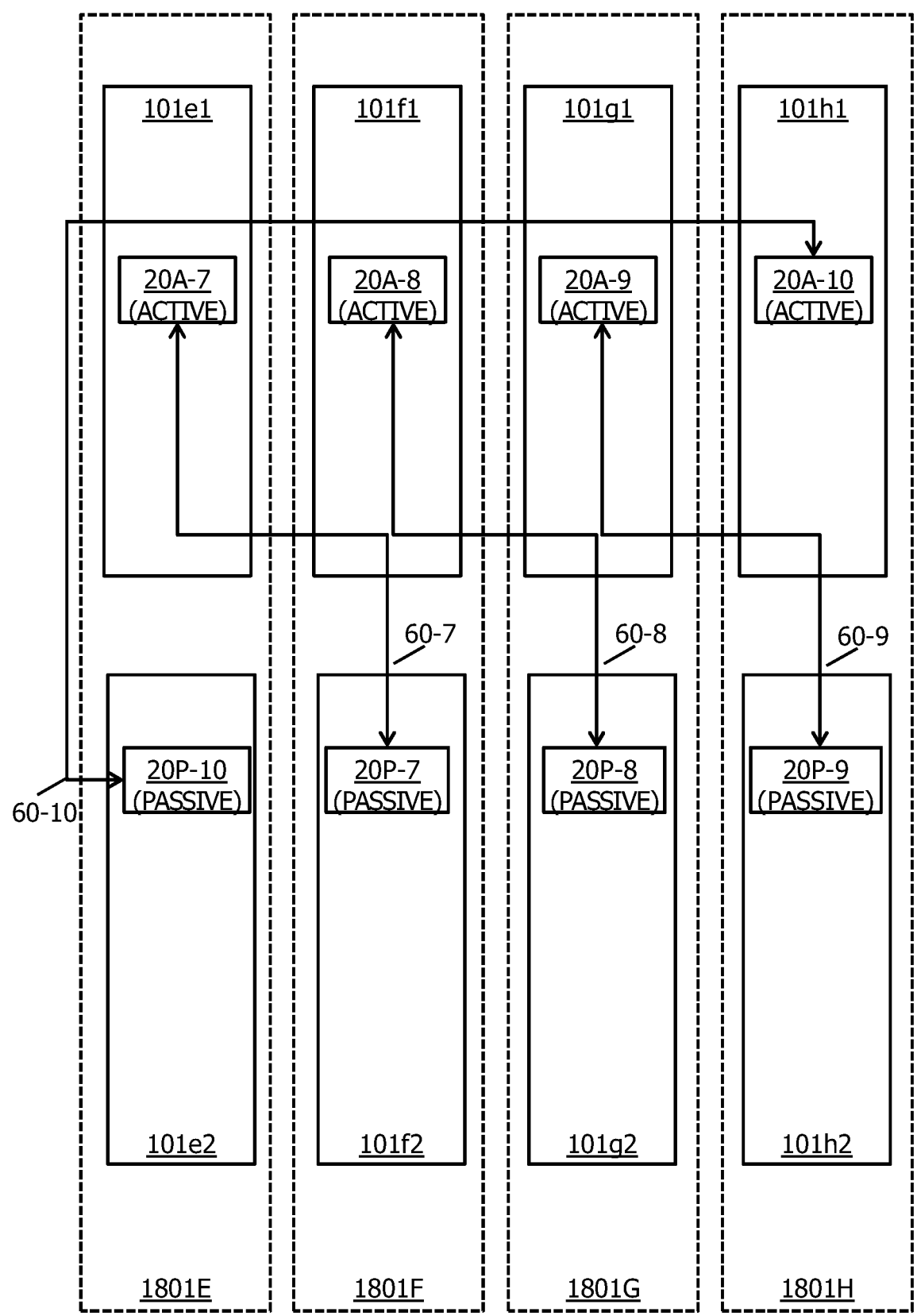
FIG. 20 illustrates a second example of the control program arrangement according to the third embodiment.

FIG. 20 illustrates a second example of the control program arrangement according to the third embodiment.

Each of a plurality of fault sets 1801E to 1801H includes the one or more active nodes 101 and the one or more passive nodes 101. The number of the passive nodes 101 and the number of the active nodes 101 in each of the plurality of fault sets 1801E to 1801H are not each limited to a particular number. However, it is preferable that the number of the passive nodes 101 is smaller than the number of the active nodes 101.

According to this example, the active control program 20A and the passive control program 20P in each of program pairs 60-7 to 60-10 are arranged in the two fault sets 1801 different from each other. For example, a passive control program 20P-w (w: natural number, w is integer in range of 7≤w≤10 in FIG. 20) in a program pair 60-w is arranged in the fault set 1801 different from the fault set 1801 which includes the passive node 101 containing the passive control program 20P-w, and is arranged in the fault set 1801 which includes the active node 101 containing an active control program 20A-(W+1) of a program pair 60-(w+1) ((w+1) is minimum w when (w+1) exceeds maximum w).

According to this example, addition or removal is allowed in units of fault set.

Furthermore, a following not-shown arrangement may be adopted as a third example of the control program arrangement according to the third embodiment. The passive nodes 101 may be distributed in the plurality of fault sets 1801. According to this arrangement, even when a fault is simultaneously caused in all the nodes 101 in the fault set 1801 including the passive nodes by a certain single fault, the passive node causing the fault is only a part of the passive nodes present in the entire system. Accordingly, the number of active control programs each losing a passive control program in a failover destination decreases.

FIG. 21 illustrates a configuration of the node management table 2100 according to the third embodiment.

According to the node management table 2100 illustrated in FIG. 21 by way of example, each entry stores information such as a fault set #2103 as well as the information 901 to 911 described above. The fault set #2103 in each of the nodes 101 indicates a number given to the fault set 1801 to which the corresponding node 101 belongs.

Figure 22:
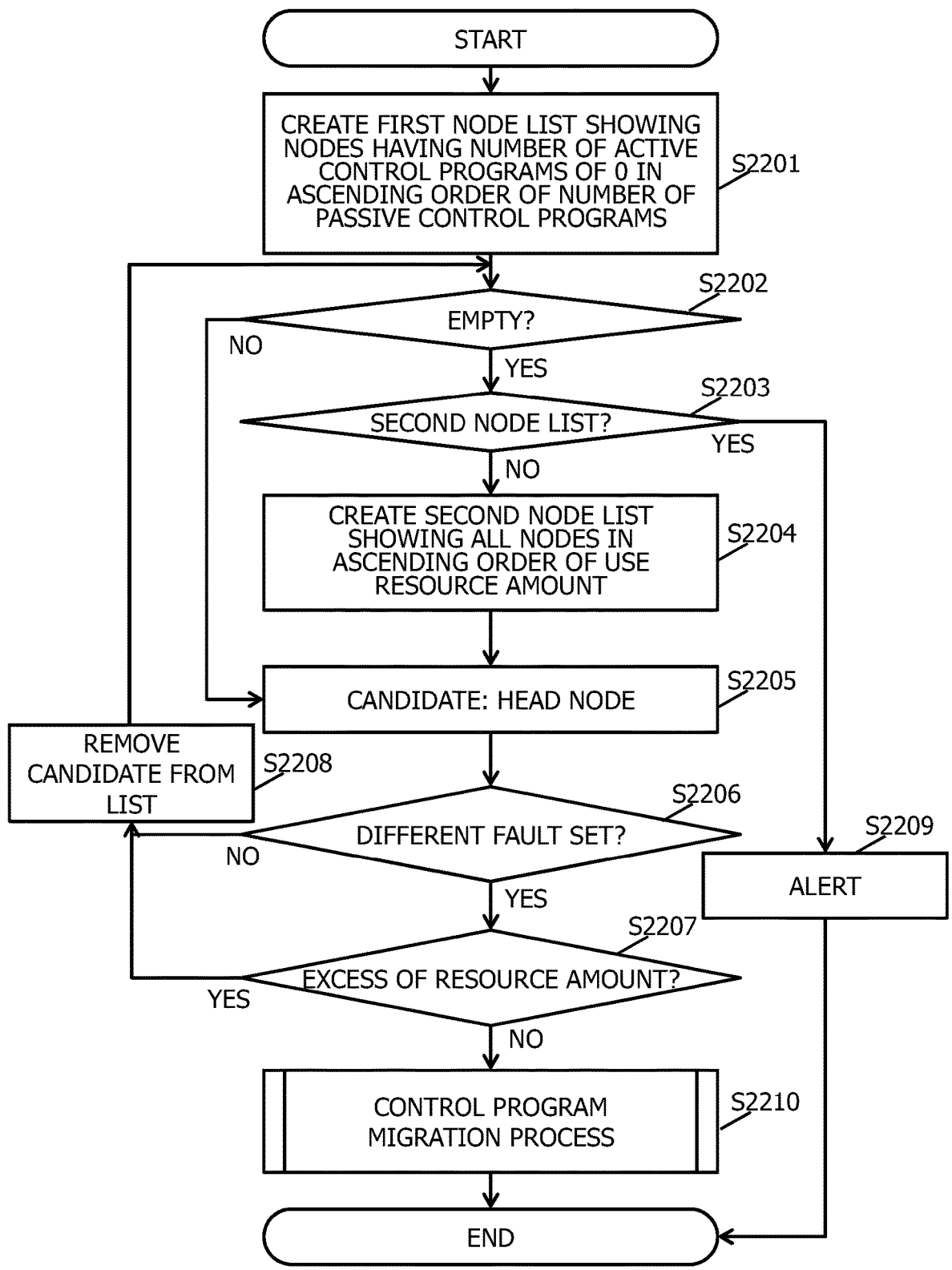
FIG. 22 shows a flow of a rearrangement control process according to the third embodiment.

FIG. 22 shows a flow of a rearrangement control process performed by the cluster control unit 35.

Processing in S2201 to S2205 in FIG. 22 is similar to the processing in S1601 to S1605 in FIG. 16. In addition, processing in S2207 to S2210 is similar to the processing in S1606 to S1609.

Accordingly, the processing shown in FIG. 22 is different from the processing shown in FIG. 16 in that S2206 is added.

The cluster control unit 35 determines whether or not the fault set 1801 including the candidate node 101 is the fault set 1801 different from the fault set 1801 including the node 101 where the active control program 20A corresponding to the target passive control program 20P (active control program 20A of program pair 60 including target passive control program 20P) based on the node management table 2100 (S2206). This determination is made to avoid deterioration of availability caused when the selected migration destination is the fault set 1801 where the corresponding active control program 20A is arranged.

When a determination result is true in S2206 (S2206: Yes), processing in S2207 is performed. When a determination result is false in S2206 (S2206: No), processing in S2208 is performed.

Fourth Embodiment

A fourth embodiment is now described. Differences from the third embodiment are chiefly described herein, and points in common with the third embodiment are not described or only briefly described. A conversion process described below and performed in the fourth embodiment may be adopted to each of the first and second embodiments to which the consideration of the fault sets 1801 has not been given.

FIG. 23 schematically illustrates an outline of the fourth embodiment.

The control program arrangement in the first to third embodiments, i.e., such an arrangement that all the passive control programs 20P are arranged in the node 101 where none of the active control programs 20A is arranged is referred to as a "separated arrangement." The separated arrangement requires the node 101 dedicated for the passive control program 20P.

When the node 101 dedicated for the passive control programs 20P is required, the number of nodes increases. Such a storage system not requiring the node 101 for the passive control program 20P may be demanded.

Accordingly, adopted in the present embodiment instead of the separated arrangement may be an integrated arrangement which arranges each the active control program 20A and the passive control program 20P constituting the same program pair 60 in the nodes 101 different from each other, but allows coexistence of the active control program 20A and the passive control program 20P in the same node 101. According to the integrated arrangement, for example, a passive control program 20-v (v: natural number, v is integer in range of 1≤v≤3 in FIG. 23) in a program pair 60-v is arranged in the node 101 which is different from the node 101 including the passive control program 20P-v, and includes an active control program 20A-(V+1) in a program pair 60-(v+1) ((v+1) is minimum v when (v+v 1) exceeds maximum v). According to the integrated arrangement, a resource amount equivalent to the resource amount of the corresponding active control program 20A needs to be secured in each of the nodes 101 to cope with a case where the passive control program 20P in the corresponding node 101 becomes a failover destination. Accordingly, execution performance of the integrated arrangement is lower than that of the separated arrangement. However, addition or removal is allowed in units of node instead of (N+m) node group.

A cluster control unit 45 is provided in at least the one node 101. For example, the cluster control unit 45 may perform the conversion process from the integrated arrangement to the separated arrangement at the time of addition of the node 101.

Figure 24:
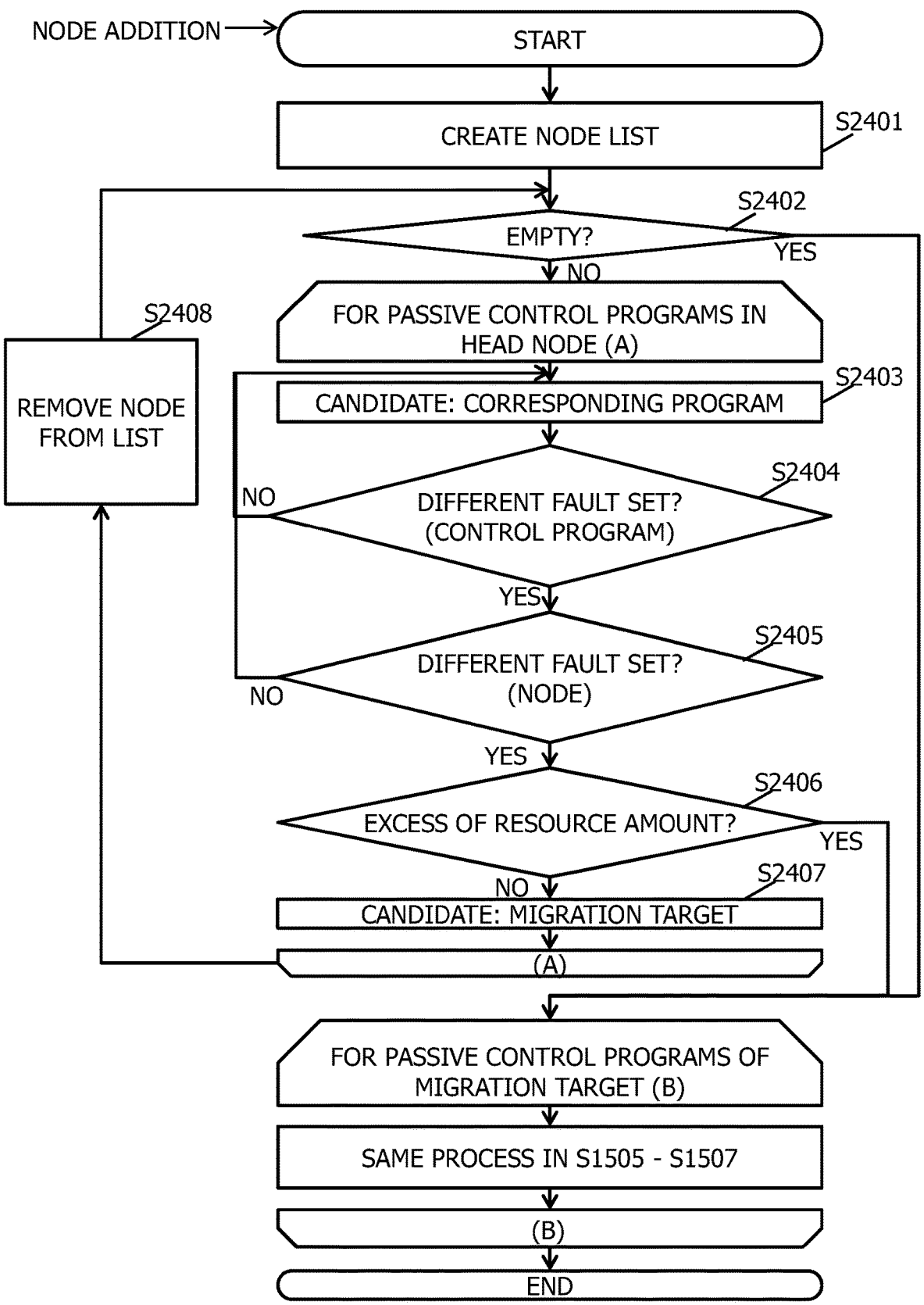
FIG. 24 shows a flow of a process performed by a cluster control unit according to the fourth embodiment.

FIG. 24 shows a flow of the conversion process performed by the cluster control unit 45. The conversion process is started at the time of a predetermined conversion start event, such as addition of the node 101. Moreover, according to this conversion process, an integrated arrangement may not be converted into a complete separated arrangement after the conversion process to avoid an excess of resources while achieving both availability and execution performance (i.e., active control program 20A and passive control program 20P may coexist in a part of the nodes 101).

The cluster control unit 45 creates a node list which is a list of all the nodes 101 each of which includes both the active control program 20A and the passive control program 20P (S2401). Accordingly, this node list does not include the added node 101. In other words, the added node 101 may become a rearrangement destination (migration destination) of each of the passive control programs 20P.

The cluster control unit 45 determines whether or not the node list is empty (S2402).

When a determination result is false in S2402 (S2402: No), the cluster control unit 45 performs processing in S2403 to S2407 for each of the passive control programs 20P in the head node in the node list. Described hereinafter is one example of the respective passive control programs 20P ("target passive control programs 20P" in description with reference to FIG. 24).

The cluster control unit 45 designates the target passive control program 20P as the candidate program 20P (S2403).

The cluster control unit 45 determines whether or not the fault set 1801 specified by following (x1) is different from the fault set 1801 specified by following (x2) (S2404). When all the nodes 101 within one of the fault sets 1801 are stopped by the same single fault point, the one or more active control programs 20A in the corresponding all nodes 101 are subjected to failover. The determination in this step is made to avoid such a situation that the passive control programs 20P as failover destinations are concentrated on the same node. The determination in S2404 may be made with reference to the node management table 2100 and the control program management table 403.

(x1) Fault set 1801 which includes the node 101 where the active control program 20A paired with the candidate program 20P to constitute the same program pair 60 is present (x2) Fault set 1801 which includes the node 101 where the active control program 20A paired with the passive control program 20P as a previous migration target to constitute the same program pair 60 is present When a determination result is false in S2404 (S2404: No), the process returns to S2403, and shifts to a process for a subsequent passive control program.

When a determination result is true in S2404 (S2404: Yes), the cluster control unit 45 determines whether or not the fault set 1801 specified by following (y1) is different from the fault set 1801 specified by following (y2) (S2405). This determination is made to avoid such a situation that the active control program 20A and the passive control program 20P constituting the same program pair 60 are arranged in the same fault set 1801. The determination in S2405 may be made based on the node management table 2100.

(y1) Fault set 1801 including the added node 101

(y2) Fault set 1801 which includes the node 101 where the active control program 20A paired with the candidate program 20P to constitute the same program pair 60 is present When a determination result is false in S2405 (S2405: No), the process returns to S2403, and shifts to a process for a subsequent passive control program.

When a determination result is true in S2405 (S2405: Yes), the cluster control unit 45 determines whether or not an excess of the resource amount is produced by a migration of the candidate control program 20P to the added node 101 based on the control program management table 403 and the node management table 402 (i.e., whether or not excess from node maximum resource amount of added node 101 is produced by addition of program resource amount of candidate program 20P (e.g., sum of program resource amounts of passive control program 20P corresponding to migration target) to node use resource amount of added node 101) (S2406).

When a determination result is false in S2406 (S2406: No), the cluster control unit 45 designates the migration target passive control program 20P as the candidate program 20P (S2407).

When a passive control program not processed yet is present, the process returns to S2403, and shifts to a process for a subsequent passive control program. When processing is completed for all the passive control programs, the head node is deleted from the node list. Thereafter, the process returns to S2402.

In a state that a determination result is true in S2406 (S2406: Yes), and that a determination result in S2402 is true in S2402 (S2402: Yes), the cluster control unit 45 ends processing in S2403 to S2407 (loop A) even before completion of this processing for all the passive control programs 20P in all the node in the node list, and performs the same processing (loop (B) in FIG. 24) as the processing in S1505 to S1507 for each of the migration target programs 20P at the current time to cause the respective migration target programs 20P to migrate to the added node 101. In this case, no excess of the resource amount is produced in the loop (B) in the rearrangement control process (FIG. 16). Accordingly, the control program migration process is performed for each of the migration target programs 20P (FIG. 17).

For example, the fourth embodiment can be expressed as follows.

Any one of the nodes 101 executes the conversion process of the program arrangement at the time of addition of the node 101. The program arrangement before the conversion process is an arrangement where each of two or more program clusters meets following conditions.

An active control program is arranged in any one of the plurality of storage nodes.

A passive control program is arranged in a storage node including an active control program of a program cluster different from the corresponding program cluster. The conversion process includes following determinations (C1) to (C3) made for each of a plurality of passive control programs in a program arrangement before the conversion process:

(C1) whether or not a fault influencing range which contains a storage node including an active control program paired with a corresponding passive control program to constitute the same program cluster is different from a fault influencing range which contains a storage node including an active control program paired with a passive control program as a previous migration target to constitute the same program cluster;

(C2) Whether or not a fault influencing range which contains the added storage node is different from the fault influencing range which contains the storage node including the active control program paired with the corresponding passive control program to constitute the same program cluster; and (C3) whether or not a resource amount of a used processing resource does not exceed a maximum resource amount after the corresponding passive control program migrates to the added storage node.

In the conversion process, a passive control program for which all of (C1) to (C3) are determined to be true becomes a migration target to be caused to migrate to the added storage node.

The scope of the present invention is not limited to the respective embodiments presented only by way of example for describing the present invention. For example, followings are allowed based on the above description. The following description may include matters not included in the above description.

For example, the plurality of nodes 101 each include the PDEV 12 (example of storage device). The active control program 20A is capable of performing I/O to and from a storage area of the PDEV 12 of each of the self-node (node including corresponding program 20A) 101 and the different node 101, and stores datasets in the PDEVs 12 of the plurality of nodes 101. The active control program 20A is capable of restoring a dataset stored in one of the plurality of nodes 101 from a dataset stored in the different node 101.

In this case, the active control program 20A may store a dataset in a manner restorable to the plurality of nodes by mirroring. More specifically, copying from a mirror dataset may be an example of "restoration." A dataset may be restored using redundancy codes included in the dataset.

The passive control program 20P may switch to active at the time of a fault or stop of the active control program 20A, and perform I/O of a dataset handled by the corresponding active control program 20A by using a logical configuration of the dataset. In this manner, I/O is allowed to continue even after the event of the fault or stop.

When the dataset stored in the node 101 including the corresponding active control program 20A is not available, the control program 20 switched to active may use a dataset stored in the node 101 different from the node 101 including the unavailable dataset to perform I/O of the corresponding dataset or a dataset restored from the corresponding dataset. In this manner, in case of mirroring, the control program 20 switched to active performs I/O of a dataset stored in the different node 101 in response to an I/O request. In case of RAID or RAIN, the control program 20 restores a dataset from a dataset distributed and stored in a plurality of the different nodes 101.

Figure 25:
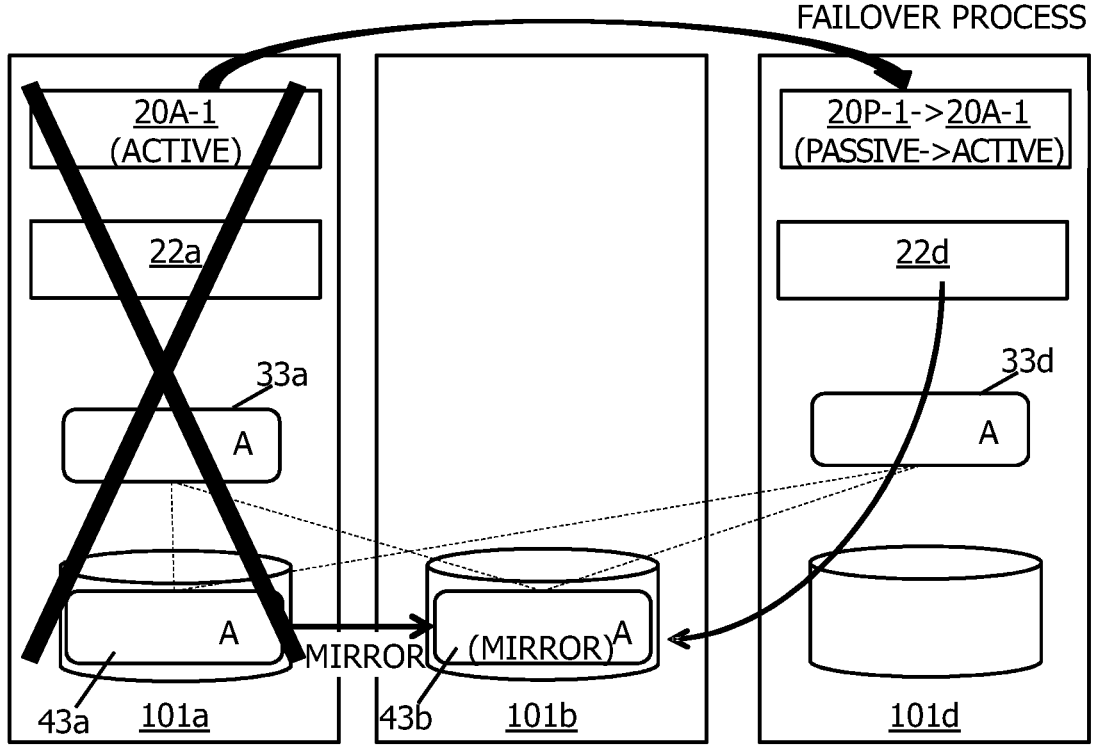
FIG. 25 schematically illustrates an example of a state where communication between nodes is necessary with lowered redundancy.
Figure 26:
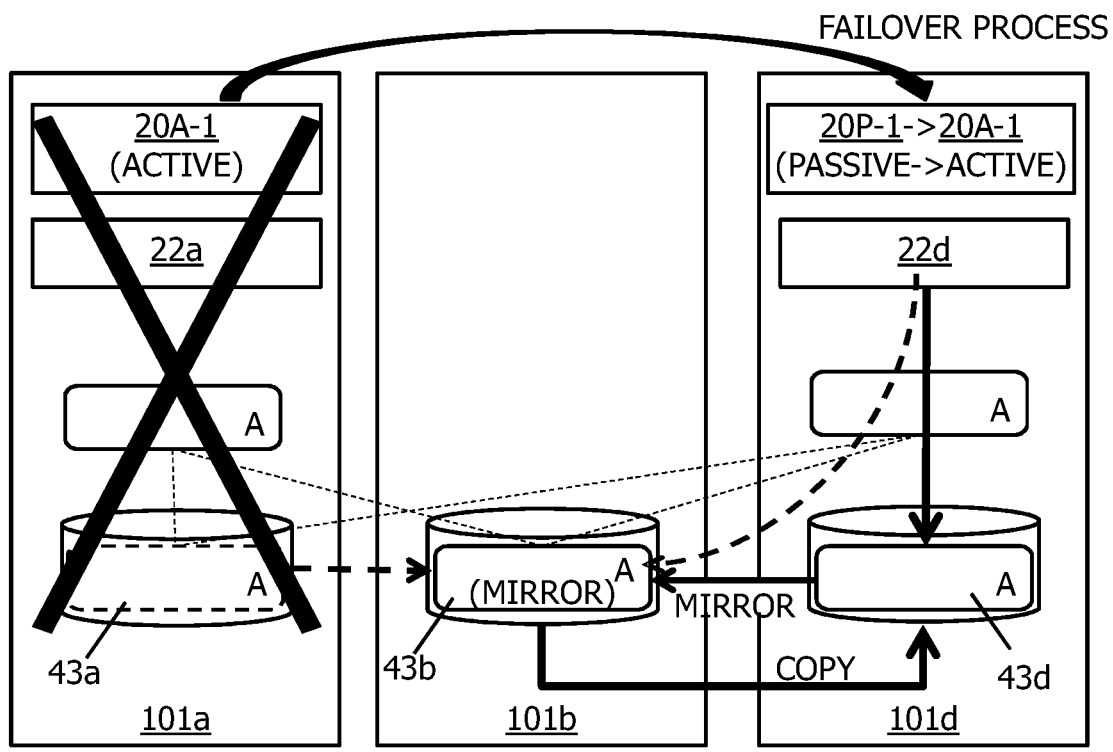
FIG. 26 schematically illustrates an example of a state where communication between nodes is unnecessary with recovered redundancy.

The control program 20 switched to active may restore a dataset not allowing I/O from a dataset stored in the different node 101, and store the restored dataset in the self-node 101. The control program 20 performs I/O using the dataset stored in the different node 101 when receiving an I/O request for the dataset before restoration. The control program 20 performs I/O using the dataset stored in the self-node 101 when receiving an I/O request for the dataset after restoration. More specifically, this processing is executed in the following manner, for example. As described above, the control program 20 switched to active by a failover process accesses a dataset via the redundancy unit 22. According to the example illustrated in FIG. 25, for example, a failover process for failover to the control program 20P-1 in the node 101*d* is performed for the active control program 20A-1 in the node 101a causing a fault. In this case, the control program 20 (20A-1) switched to active accesses a dataset A in the node 101b from the node 101d via the redundancy unit 22d to continue I/O when a mirror destination of the dataset A used by the control program 20A-1 is the node 101b. However, communication between the nodes is required in this state, wherefore performance deteriorates. Moreover, redundancy of the dataset is also kept low. Accordingly, as illustrated in FIG. 26, the redundancy unit 22 (or cluster control unit) of the node 101 included in anyone of a failover source, a failover destination, and a master restores (copies) the dataset A, which has been mirrored from the node 101a of the failover source to the node 101b of the mirror destination (example of backup), such that the dataset A can be restored from the node 101b of the mirror destination to the node 101d of the failover destination. In this manner, I/O is achievable by the control program 20 (20A-1) in the node 101d of the failover destination via the redundancy unit 22d without communication between the nodes. Moreover, redundancy recovers. Similar processing is achievable by a redundancy configuration other than mirror (e.g., RAID and RAIN).

Any one of the control programs 20 may restore a dataset stored in the node 101 including the active control program 20A causing a fault or stop by using a dataset stored in the different node 101, and store the restored dataset in the node 101 including the control program 20 switched to active. In this manner, redundancy (standby dataset) similarly recovers based on restoration of a dataset in the node 101 causing a fault by using a dataset associated with the different control program 20. The "any one of the control programs 20" in this paragraph may be any one of the control program switched to active, control program associated with a dataset corresponding to a restoration target, and designated control program (e.g., control program designated by management system 202 or cluster control unit).

What is claimed is:

1. A storage control method for a storage system that includes a plurality of storage nodes each of which includes one or more processors, and includes one or more storage devices each of which stores data, the method comprising:
    detecting that any one of a plurality of passive control programs included in two or more program clusters operating on a plurality of the processors included in the plurality of storage nodes has been switched to active; and
    changing an operation status of a different passive control program operating in the storage node that includes a passive control program switched to active;
    generating a first storage node list and a second storage node list;
    wherein:
    each of the control programs is a program for performing input and output to and from a storage area associated with the corresponding control program;
    each of the two or more program clusters includes
        an active control program, and
        a passive control program that becomes active in place of the active control program;
    a processing resource of at least one of the one or more processors is more used by the passive control programs in an active state than in a passive state; and
    the active control program and the passive control program included in a same program cluster are each arranged in the storage nodes different from each other, each of the plurality of storage nodes being configured to include a plurality of the active control program or the plurality of the passive control programs;
    the first storage node list includes a list of all storage nodes with zero active control programs in an ascending order of a number of passive control programs;
    the second storage node list includes a list of all storage nodes in an ascending order of use resources amount; and
    the passive control program switched to active is selected from the first storage node list or the second storage node list.

2. A storage system comprising:
a plurality of storage nodes each of which includes one or more processors; and
one or more storage devices each of which stores data, wherein:
    the plurality of storage nodes each includes two or more program clusters that include a plurality of active or passive control programs each of which operates on at least one of the one or more processors;
    each of the control programs is a program for performing input and output to and from a storage area associated with the corresponding control program, wherein each of the control programs generates a first storage node list and a second storage node list;
    each of the two or more program clusters includes
        an active control program, and
        a passive control program that becomes active in place of the active control program;
    a processing resource of at least one of the one or more processors is more used by the control programs in an active state than in a passive state;
    the active control program and the passive control program included in a same program cluster are each arranged in the storage nodes different from each other, each of the plurality of storage nodes being configured to include the plurality of the active or passive control programs; and
    when any one of the plurality of the passive control programs is switched to active, a change of an operation status is made for a different passive control program operating in the storage node that includes the passive control program switched to active;
    wherein the first storage node list includes a list of all storage nodes with zero active control programs in an ascending order of a number of passive control programs;
    wherein the second storage node list includes a list of all storage nodes in an ascending order of use resources amount; and
    wherein the passive control program switched to active is selected from the first storage node list or the second storage node list.

3. The storage system according to claim 2, wherein the change of the operation status stops the different passive control program, or causes the different passive control program to migrate to one of different storage nodes and operates the different passive control program in one of the different storage nodes to reduce a processing resource used by the different passive control program.

4. The storage system according to claim 3, further comprising a cluster control unit that manages allocations of processing resources to the control programs in the plurality of storage nodes, wherein the cluster control unit causes the different passive control program to stop or migrate, and/or determines the storage node corresponding to a migration destination when the different passive control program is caused to migrate.

5. The storage system according to claim 4, wherein the storage node corresponding to the migration destination is determined based on a use status of a processing resource in the storage node corresponding to the migration destination.

6. The storage system according to claim 5, wherein the storage node corresponding to the migration destination is determined based on a use status of the processing resource used not by the passive control program to be caused to stop or migrate in the storage node corresponding to the migration destination.

7. The storage system according to claim 4, wherein:
a plurality of single fault point common ranges including the plurality of storage nodes are provided; and
the storage node corresponding to the migration destination is selected such that the passive control program caused to migrate to the storage node selected as the migration destination belongs to one of the single fault point common ranges different from the single fault point common range that includes the active control program corresponding to the passive control program to be caused to migrate.

8. The storage system according to claim 2, wherein:
each of the plurality of storage nodes includes at least one of the one or more storage devices;
the active control program is configured to perform input and output to and from storage areas of the storage devices of a self-storage node and the storage nodes other than the self-storage node, and stores datasets in the storage devices of the plurality of storage nodes; and
the active control program is configured to restore a dataset stored in one of the plurality of storage nodes storing datasets based on a dataset stored in one of the storage nodes other than the storage node storing the dataset to be restored.

9. The storage system according to claim 8, wherein the active control program stores a dataset in such a manner that the dataset can be restored in the plurality of storage nodes by mirroring.

10. The storage system according to claim 2, wherein the passive control program switches to active at a time of a fault or stop of the active control program corresponding to the passive control program switched to active, and performs input and output of a dataset handled by the active control program corresponding to the passive control program switched to active, by using a logical configuration of the dataset.

11. The storage system according to claim 10, wherein, when a dataset stored in the storage node that includes the active control program corresponding to the passive control program switched to active is unavailable, the passive control program switched to active performs input and output of a dataset stored in a different storage node from the storage node associated with the unavailable dataset, or a dataset restored based on the dataset stored in the storage node different from the storage node associated with the unavailable dataset.

12. The storage system according to claim 11, wherein:
the passive control program switched to active restores a dataset that does not allow input and output based on a dataset stored in one of the different storage nodes;
the passive control program switched to active stores the restored dataset in a self-storage node, and performs input and output of the dataset stored in one of the different storage nodes in response to reception of an input and output request for the dataset before restoration; and
the passive control program switched to active performs input and output of the dataset stored in the self-storage node in response to reception of an input and output request for the dataset after restoration.

13. The storage system according to claim 12, wherein any one of the control programs restores a dataset stored in the storage node that includes the active control program causing the fault or stop based on a dataset stored in one of the different storage nodes, and stores the restored dataset in the storage node that includes the passive control program switched to active.

14. A computer system comprising a plurality of storage nodes each of which includes one or more processors, and includes one or more storage devices each of which stores data, under the program one of the plurality of storage nodes detecting that any one of a plurality of passive control programs included in two or more program clusters operating on a plurality of the processors included in the plurality of storage nodes has been switched to active, and the one storage node changing an operation status of a different passive control program operating in the storage node that includes the passive control program switched to active,
wherein:
each of the control programs is a program for performing input and output to and from a storage area associated with the corresponding control program;
each of the control programs generates a first storage node list and a second storage node list;
each of the two or more program clusters includes:
an active control program, and
a passive control program switched to active in place of the active control program;
a processing resource of the at least one of the one or more processors is more used by the passive control programs in an active state than in a passive state; and
the active control program and the passive control program included in a same program cluster are each arranged in the storage nodes different from each other, each of the plurality of storage nodes being configured to include a plurality of the active control program or the plurality of the passive control programs;
the first storage node list includes a list of all storage nodes with zero active control programs in an ascending order of a number of passive control programs;
the second storage node list includes a list of all storage nodes in an ascending order of use resources amount; and
the passive control program switched to active is selected from the first storage node list or the second storage node list.

* * * * *